US009077857B2

(12) United States Patent
Amento et al.

(10) Patent No.: US 9,077,857 B2
(45) Date of Patent: Jul. 7, 2015

(54) GRAPHICAL ELECTRONIC PROGRAMMING GUIDE

(75) Inventors: Brian Scott Amento, Morris Plains, NJ (US); Alicia Abella, Morristown, NJ (US); Christopher Harrison, Mount Kisco, NY (US); Larry Stead, Upper Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 875 days.

(21) Appl. No.: 12/242,605

(22) Filed: Sep. 30, 2008

(65) Prior Publication Data
US 2010/0071000 A1 Mar. 18, 2010

Related U.S. Application Data

(60) Provisional application No. 61/096,417, filed on Sep. 12, 2008.

(51) Int. Cl.
*H04N 7/173* (2011.01)
*H04N 21/4725* (2011.01)
*H04N 21/25* (2011.01)
*H04N 21/258* (2011.01)
(Continued)

(52) U.S. Cl.
CPC ........... *H04N 7/173* (2013.01); *H04N 21/4725* (2013.01); *H04N 21/252* (2013.01); *H04N 21/25891* (2013.01); *H04N 21/44204* (2013.01); *H04N 21/4438* (2013.01); *H04N 21/4532* (2013.01); *H04N 21/4722* (2013.01); *H04N 21/4756* (2013.01); *H04N 21/482* (2013.01); *H04N 21/84* (2013.01)

(58) Field of Classification Search
CPC . H04N 21/252; H04N 21/84; H04N 21/4722; H04N 21/4725; H04N 21/482
USPC ............... 725/37–61; 345/419; 707/102; 715/781–782, 841, 848–851
See application file for complete search history.

(56) References Cited

U.S. PATENT DOCUMENTS 6,405,239 B1   6/2002  Addington et al.
6,481,011 B1 * 11/2002  Lemmons ....................... 725/47
(Continued)

FOREIGN PATENT DOCUMENTS

JP    H11 220703   * 8/1999  ............. H04N 5/445

OTHER PUBLICATIONS

Pouwelse, Johan et al., P2P-Based PVR Recommendation using Friends, Taste Buddies, and Superpeers, Workshop: Beyond Personalization 2005, IUI'05, Jan. 9, 2005, San Diego, California, USA, 6 pages.

*Primary Examiner* — Hunter B Lonsberry
*Assistant Examiner* — Patrick A Ryan
(74) *Attorney, Agent, or Firm* — Jackson Walker L.L.P.

(57) ABSTRACT

Disclosed systems and methods present a graphics based electronic programming guide (EPG) that organizes available content in radial fashion on a display. Which content appears on a screen shot of the EPG may be determined using rating data, user preferences or collaborative filtering. Through collaborative filtering, disclosed embodiments may predict which programs a user may like according to group member ratings. Some disclosed EPGs include a mosaic with graphical indications of an overall rating and graphical indications of which of a plurality of characteristics (e.g., genres) apply to multimedia programs.

27 Claims, 11 Drawing Sheets

(51) Int. Cl.
*H04N 21/442* (2011.01)
*H04N 21/443* (2011.01)
*H04N 21/4722* (2011.01)
*H04N 21/475* (2011.01)
*H04N 21/84* (2011.01)
*H04N 21/45* (2011.01)
*H04N 21/482* (2011.01)

(56) References Cited

U.S. PATENT DOCUMENTS

| | | | |
|---|---|---|---|
| 6,505,194 B1 * | 1/2003 | Nikolovska et al. | 707/768 |
| 7,028,036 B2 * | 4/2006 | Chickering et al. | 345/581 |
| 7,437,320 B2 * | 10/2008 | Davidson et al. | 705/7.11 |
| 7,689,556 B2 * | 3/2010 | Garg et al. | 707/765 |
| 7,734,680 B1 * | 6/2010 | Kurapati et al. | 709/203 |
| 7,765,571 B2 * | 7/2010 | Morris | 725/52 |
| 2004/0103092 A1 | 5/2004 | Tuzhilin et al. | |
| 2006/0064716 A1 * | 3/2006 | Sull et al. | 725/37 |
| 2006/0271955 A1 * | 11/2006 | Saito et al. | 725/45 |
| 2007/0005437 A1 | 1/2007 | Stoppelman | |
| 2007/0106661 A1 * | 5/2007 | Narita et al. | 707/5 |
| 2008/0052371 A1 | 2/2008 | Partovi et al. | |
| 2008/0288596 A1 * | 11/2008 | Smith et al. | 709/206 |

* cited by examiner

GRAPHICAL ELECTRONIC PROGRAMMING GUIDE

BACKGROUND

1. Field of the Disclosure

The present disclosure relates to multimedia services, and more particularly, to managing the selection and delivery of multimedia content through a graphical electronic programming guide.

2. Description of the Related Art

Multimedia streams used for sending multimedia programs (e.g., television shows) often have robust, but underutilized, metadata. Conventional program guides (e.g., electronic programming guides) present shows in a list view with metadata shown in an information window. Such linear interfaces do not allow users to explore what other users are watching, what other users have watched, or what other users like.

DESCRIPTION OF THE EMBODIMENTS

Figure 1:
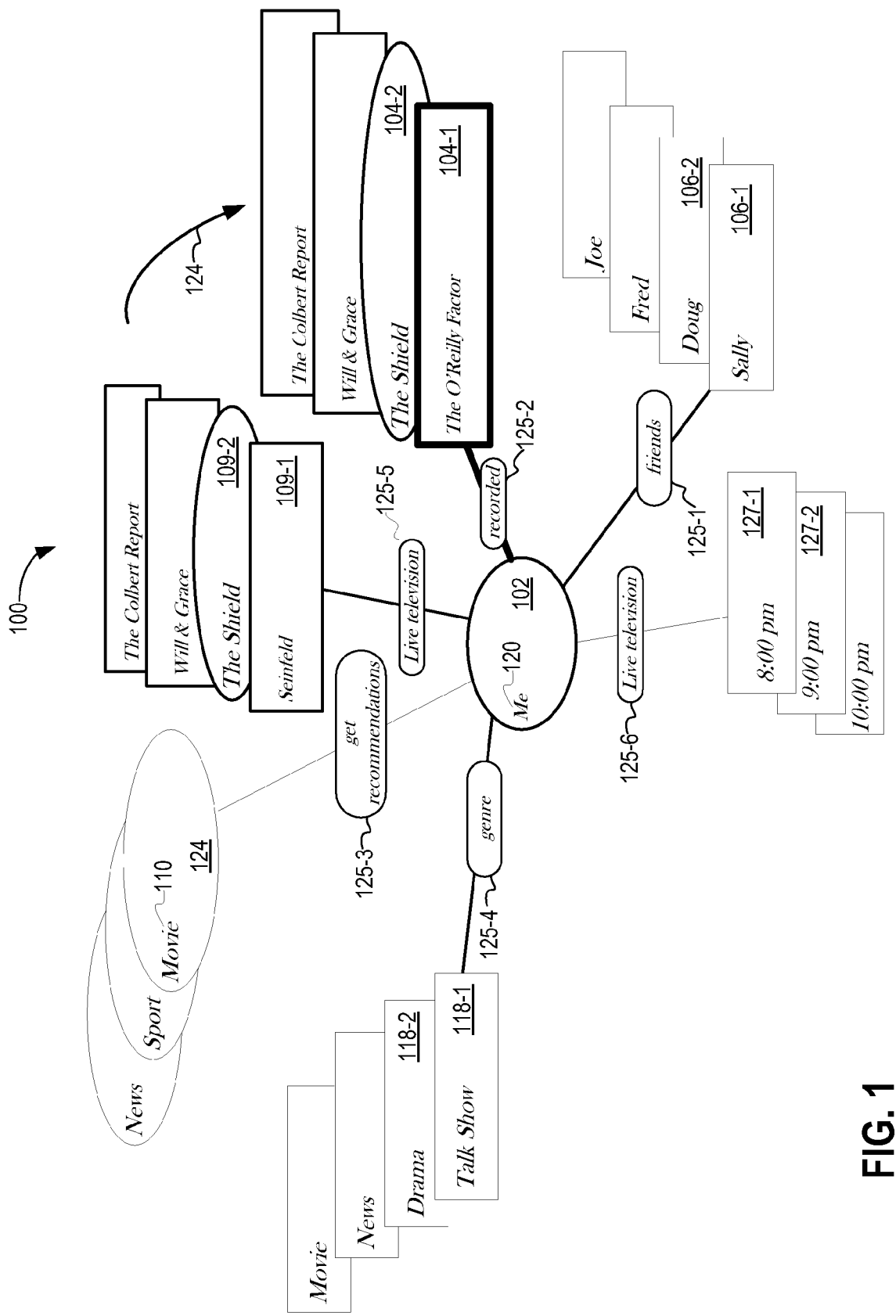
FIG. 1 illustrates a view of a disclosed electronic programming guide (EPG) arranged in a radial fashion with peripheral nodes surrounding a primary node, wherein a peripheral node indicating "The O'Reilly Factor" is highlighted (i.e., peripheral node 104-1)

In one aspect, a method is disclosed for presenting an EPG for navigating a plurality of available content and selecting a multimedia program. The disclosed method includes providing a primary node and an identifier for the primary node on a display that includes a primary node identifier such as a user name or the title of a multimedia program. Accordingly, the primary node represents a primary component such as a user or multimedia program. The method further includes providing a plurality of peripheral nodes positioned around the primary node in a radial fashion. The peripheral nodes represent secondary components that are a subset of the primary component of the primary node. For example, secondary components may represent actors of a movie, wherein the movie is the primary component represented by the primary node. In such embodiments, the secondary components are a subset of the primary component.

In some disclosed EPGs, a plurality of additional secondary components are associated with secondary components represented by the peripheral nodes. The additional secondary components and the secondary components represented by the peripheral nodes may be associated by common categories such as "genres," "multimedia programs viewed by friends," or "multimedia programs recorded by friends." In some disclosed EPGs, a common category is "recommended multimedia programs" and the secondary component represented by the peripheral node and the additional secondary components are associated with each other in response to a prediction that a user of the EPG may like one or more multimedia programs that correspond to the secondary components. Rating data provided by members of a collaboration group may be used to predict whether a user will like a multimedia program, and consequently whether the multimedia program will be one of the additional secondary components associated or whether the multimedia program will be a secondary component represented by a peripheral node. Peripheral nodes and graphical elements (e.g., secondary element nodes) representing any secondary component on disclosed EPGs may be presented to a user with an indication of which secondary component is likely to be more applicable to the user. For example, the peripheral nodes and secondary element nodes that represent the additional secondary components may represent multimedia programs and may be presented in an order related to a degree to which the user is predicted to prefer represented multimedia programs. The ordering of peripheral nodes and secondary element nodes may be in response to rating data, and the rating data may come from a collaboration group. In addition, the rating data may be inferred from the viewing habits of a plurality of group members. In some embodiments, collaborative group member behavior is estimated during the viewing of the multimedia program and the response of the collaborative group member to the multimedia program is estimated and used to decide which multimedia programs to present on disclosed EPGs for selection by collaborative group members.

The secondary components, the additional secondary components, and the secondary element nodes are associated with at least one peripheral node. The secondary element nodes corresponding to a peripheral node may be arranged according to a rating. The rating may come from recommendations from members of a collaborative group or may be automatically inferred from viewing habits of the members. Some disclosed methods may include receiving rating data for a portion of the secondary element nodes and the peripheral node and arranging the secondary element nodes and the peripheral node in order of their respective ratings, with the peripheral node being the most highly rated. Peripheral nodes and secondary element nodes may be coded according to color, shape, or other indications to relay social network data, rating data, availability for recording, and the like. Some disclosed systems allow for collaborative filtering. Through collaborative filtering, disclosed methods include choosing from available programs, which programs are presented on an EPG. The choosing of which available programs to present on the EPG may result from a prediction of whether the user may like the programs based on rating data, which may be from a collaboration group.

In some embodiments, the category corresponding to a peripheral node and its associated secondary element nodes may be multimedia programs that have been viewed or recorded by a plurality of group members. Primary nodes and peripheral nodes may be arranged such that the primary node is in the center of a display and peripheral nodes form a circle or oval around the primary node. Such an arrangement lends itself to easily navigating selectable content and receiving and acting on rating data that may be generated from a collaborative group. For example, a user may provide successive inputs to a remote control device and scroll in a circular fashion among peripheral nodes. Upon finding a peripheral node of interest (e.g., a multimedia program title that the user wishes to view), the user may provide a selection input to the remote control device. In response to the selection input, the selected peripheral node becomes a primary node on a refreshed display and a new set of peripheral nodes, that represent secondary components that are a subset of the new primary component, are displayed. Using disclosed embodiments, a user may see what his friends are watching, and in some cases can see what his friend's friends are watching, and can therefore make choices about what to watch.

Disclosed methods of providing EPGs may include, in addition to providing a primary node displayed with a plurality of peripheral nodes surrounding it, providing a compact mosaic that includes ratings information and other information that classifies multimedia programs. Accordingly, a plurality of identifiers (e.g., rectangles) are each provided with a label (e.g., a program title) that identifies a multimedia program. Classification elements that correspond to each multimedia program have a first size in a first dimension (e.g., a width) that corresponds to an overall rating of the multimedia program. In some embodiments, each classification element is sized in a second dimension (e.g., a length) according to the degree to which the corresponding multimedia program belongs to a genre (e.g., comedy) that corresponds to the classification element.

In still another aspect, a disclosed data processing system provides an EPG and includes instructions for presenting a primary node on the display that includes an identifier that represents a primary component, presenting a plurality of peripheral nodes on the display that represent secondary components that belong to a subset of the primary component. In some embodiments, instructions are for presenting third order nodes that are associated with peripheral nodes. The third order nodes represent tertiary components that belong to a subset of the secondary component. The peripheral nodes and the third order nodes may include rating data derived from a social network.

Accordingly, disclosed systems and methods present a graphics based EPG that organizes available content in radial fashion on a display. Which available content appears on a screen shot may be determined using rating data or user preferences. In addition, which available content appears on the EPG may be at least partially determined by collaborative filtering. Through collaborative filtering, disclosed embodiments may predict which programs a user may like according to collaborative group member ratings. Some disclosed EPGs include for each multimedia program graphical indications of an overall rating and graphical indications of which of a plurality of characteristics (e.g., genres) apply to the multimedia program.

Digital television programs are often associated with a rich set of metadata that may include, for example without limitation, a listing of actors, writers, directors, guest stars, air dates, and genres associated with the programs. Users may benefit from the ability to navigate programming guides and select programs in nonlinear ways. Disclosed EPGs present a new interface concept for navigating the multidimensional information associated with television. Further, disclosed EPGs provide for the visualization for show rating data.

Disclosed embodiments provide a social, asynchronous television viewing experience that allows users to select multimedia programs in non-linear ways. Some embodiments provide a user with on screen elements for navigating a multidimensional information space that includes metadata and ratings information associated with multimedia programs. A user may navigate embodied EPGs to find multimedia programs that are highly rated among collaboration groups as well as multimedia programs that are in line with their viewing interests. Users are also provided with enhanced EPGs for deciding what multimedia programs to record. In some embodiments, users are provided enhanced programming guides for content that is already recorded. For example, a user may view all recorded programs in a radially oriented graphical interface and simultaneously receive ratings input provided by other users that may be in a collaboration group with the user.

Conventional EPGs are often provided as a matrix organized by time and channel. The primary selection method for such conventional electronic programming guides is to navigate a list and press enter upon a list item of interest becoming highlighted. Some conventional EPGs may allow users to organize their content into trees, for example by genre, series, episode, and the like. However, such EPGS only display a single level at any given time and there is no way to jump between sub-trees other than recursing back to a common parent node. Some conventional EPGs allow a user to search for particular entries. For example, a user may search for "Harrison Ford" to find programming in which he stars or appears. However, no conventional EPG allows seamless navigation of multiple entity types in a unified interface. Disclosed embodiments provide such a unified interface and incorporate social rating data to aid users in program selection.

Disclosed systems may automatically receive metadata for multimedia programs over a content provider network or may achieve such metadata from network resources. For example, a disclosed system may fetch metadata about recorded content from Zap2It.com. The metadata may be provided in a linear list, with each multimedia program having a unique record that contains information such as channel, air date, title, and actors. In accordance with some disclosed embodiments, the information is processed and converted into a cyclic, undirected graph. A special "me" node for the user may be inserted into an EPG and all series the user has recorded may be connected to the node. For example, contained in circles radially located around the "me" node may be secondary nodes that contain program titles. For example, "Lisa Gets an A" is an episode of "The Simpsons." A secondary node may contain "The Simpsons" and a tertiary node emanating from the secondary node may contain "Lisa gets an A." Similarly, a further secondary node may be "Law & Order" and a tertiary node emanating from the further secondary node may contain "Dick Wolf," who is the executive producer of that episode of "Law & Order." In this way, a user is provided an egocentric view of all of his or her recorded content that allows for rapid navigation and selection based on metadata associated with each recorded program.

Selection of the secondary node "The Simpsons" may result in a "The Simpsons" node becoming the primary node that other nodes are placed around. As secondary nodes in the new view, past and present episodes of "The Simpsons" may be presented for selection. A secondary node may be titled "Lisa Gets an A," and an indication that the program has already been recorded may also be included. In some embodiments, indications of whether friends in a collaboration group have recorded various episodes of "The Simpsons" may also be presented. Peripheral friend data may also be provided within disclosed EPGs, which would tell a user whether friends of friends had recorded various episodes. Such disclosed systems provide users with intuitive, graphic based tools for navigating and selecting multimedia content based on metadata such as actors, directors, air dates, ratings, and genres.

In some embodiments, an item of interest (e.g., a television program) is centered on a display as primary node and peripheral nodes associated with entities (e.g., actors) radiate out from it. The secondary nodes, and nodes dependent from secondary nodes, may be organized in a dynamic fan-like layout. Each node may be color-coded to facilitate recognition. In some embodiments, varying shapes are used for the nodes. For example, a multimedia program that has received a threshold level of negative feedback may be shown inside a silhouette of a thumbs down. Connections between nodes of varying orders may be shown as lines. In some embodiments, the lines may be dashed, solid, or have varied colors to indicate further parameters. For example, a dashed line may indicate a program that has not yet been broadcast. A small textual description may also accompany the lines that connect nodes of different orders. Nodes, programs, lines, and the like that are selected by a user during navigation of embodied EPGs may be highlighted in some way to indicate potential selection.

Some embodiments may use keyboards, mice, or pointer instruments to receive user input to navigate disclosed EPGs. In some embodiments, a remote control device with as few as two buttons is used to provide clockwise or counterclockwise selection. A third button may provide for selection of EPG elements. A rotating wheel may also be used to navigate in a clockwise or counterclockwise direction. Depressing the rotating wheel may be used for selection of EPG elements. In some embodiments, a ball roller is used to navigate in all directions on a display. Upon selection of an EPG element, for example by depressing a select or enter button, the selected node becomes the primary node (i.e., the center node) on a new display image. A user may be presented with a virtual "back" button as a peripheral node, which enables the previous display to be shown again. In addition, a "home" button may be presented as a further peripheral node to allow a user to navigate back to the egocentric view in which the "me" node is the primary node. In some cases, a user may enter a search string, in which results of the search string may be presented in a new view as the primary node. Alternatively, a plurality of search results may be displayed simultaneously, with each search result having a primary node and surrounding secondary nodes. Upon selection of one of the search results, the remaining unselected search results (i.e., the primary node and secondary nodes for the unselected search results) may be removed from the display.

Disclosed systems and methods allow users to quickly search for content based on metadata. For example, a user could easily navigate in the following manner Me>Seinfeld>Sitcoms>Fresh Prince of Bel-Air>Will Smith>Men in Black>Action>24.

In some conventional EPGs, multimedia programs are pigeonholed into a single, broad genre. Since many shows have complex, multi-faceted plots, a ratings scheme that allows users to rate multiple attribute dimensions is valuable. Disclosed embodiments may use any of several methods to collect rating data, which may be used to estimate user engagement and interest in particular multimedia programs. Users may fill out questionnaires and the answers may be incorporated manually or automatically into ratings information that is provided to other users. Each of the users may be in the collaboration group, and may be able to receive only the ratings information provided by other members of the collaboration group. In some embodiments, viewers are monitored using sensors placed in a viewing area that automatically detect an interest level of the viewer regarding the multimedia program. For example, pulse rate monitors, blood pressure monitors, audible outburst detectors, motion detectors, bone conduction microphones, speech recognition devices, and the like may be used with automated systems that characterize whether viewers like or dislike a multimedia program. Such information may be integrated for a general population, a viewing area, or a collaboration group and provided as part of disclosed EPGs.

In some embodiments, user data is collected through an interface presented by a set-top box (STB) that operates in conjunction with the service provider network that provides IPTV based multimedia content. Users in a collaboration group are asked to rate shows on five criteria that include: action/adventure, comedy, drama, suspense/mystery/horror, and educational/documentary. An overall rating is also collected. These values can be set from 1 to 5, or "NA" if not applicable. This data is collected group-wide and is displayed for all recorded series.

In accordance with some disclosed embodiments, the collected data is presented in a compact mosaic plot with columns and rows. Each column may represent a television series with the width of the column representing the overall show rating. The columns may also be segmented horizontally, forming bands that represent a particular attribute of the show (e.g., action or comedy). The height of the band represents its relative rating to the other attributes. The bands may be color coded to ease recognition, especially between shows. In such embodiments, the combination of width for overall rating and height for attribute rating causes dominant attributes in highly rated shows to become prominent.

In accordance with disclosed embodiments, social data may be infused into embodied EPGs. For example, viewer comments may be presented as peripheral nodes that surround a primary node with a reference to a past or scheduled football game. In addition to such textual annotations, interest profiles, the number of previous viewers, the number of scheduled viewers, recommendations from friends, and the like may be included in disclosed electronic programming guides. Disclosed navigation graphs may support new entity types, including airtime (e.g., 9 pm), channel (e.g., NBC), duration (e.g., 30 minutes), characters (e.g., Al Bundy) and other items of interest. Accordingly, disclosed embodiments provide powerful ways for people to locate content for viewing or recording. For example, a user may easily navigate a disclosed EPG to find a highly rated show that is rated TV14 and is 30 minutes in length.

Disclosed EPGs provide enhanced social networking information in an intuitive graphical fashion. For example, disclosed EPGs make it possible for a user to center a friend as a primary node and see each of the multimedia programs the friend has recorded as a peripheral node. Additionally, friends can also connect to entities they have explicitly noted as favorites, for example, their favorite actor or genre. Various input modalities may be used including speech, gesture, and vision systems to receive input regarding user ratings and preferences. In addition, such input modalities may be used for navigating disclosed EPGs.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 illustrates a view of EPG 100 arranged in a radial fashion with peripheral nodes (e.g., peripheral nodes 124, 118-1, 127-1, 106-1, 109-1 and 104-1) surrounding primary node 102. As shown, peripheral node 104-1 is highlighted, which indicates that a user may select peripheral node 104-1 and its underlying multimedia program (i.e., "The O'Reilly Factor") for viewing the program, recording the program, or receiving further information about the program. Category 125-2 has the text "recorded" with it to indicate that peripheral node 104-1 and its associated secondary element nodes (e.g., secondary element node 104-2) are multimedia programs that have been recorded by the primary component (i.e., the user described by identifier 120 as "Me") represented by primary node 102. Similarly, category 125-5 indicates that the secondary component (i.e., one or more episodes of "Seinfeld") represented by peripheral node 109-1 is available for live television viewing. In the context of this disclosure, "live television" indicates programming which may be previously recorded but that is broadcast, unicast, or multicast and available to the user of EPG 100. Similarly, the secondary element node 109-2, which represents secondary component "The Shield" is available for live television viewing. As shown, it is coded in an oval shape, which in some embodiments represents that the secondary component (i.e., "The Shield") represented by secondary element node 109-2 is recommended by EPG 100. Such recommendations may come from collaborative group member data or rating data.

Peripheral node 124 represents secondary component 110 which has an identifier "Movie." Peripheral node 124 as shown is connected to primary node 102 and belongs to a category 125-3 related to "get recommendations." Likewise, secondary element nodes for "Sport" and "News" may be related to category 125-3 as shown. If a user navigates EPG 100 in a circular direction shown by arrow 124, peripheral node 124 may be selected to allow the user to get movie recommendations. The movie recommendations may be based on predicting what the user of EPG 100 may like. The predicting may be based on inferred group member data, group member rating data expressly received from group members, or from inferences made by monitoring viewing habits, for example, of the user of EPG 100.

Peripheral node 118-1 belongs to category 125-4 and allows the user of EPG 102 to navigate to a further display which will contain a primary node with an identifier "genre" and peripheral nodes with identifiers, "Talk Show," "Drama," "News," and "Movie." As shown, peripheral node 118-1 belongs to the category 125-4 (i.e., a genre category) with secondary element node 118-2 which represents a secondary component which is a "Drama" genre.

Peripheral node 127-1 belongs to a category 125-6 that is "Live television" and is arranged by time. As shown, peripheral node 127-1 is a secondary component that is "8:00 PM." Additionally, secondary element node 127-2 also belongs to category 125-6 (i.e., a "Live television" category) and has a further secondary component which is "9:00 PM." Category 125-6 complements category 125-5 in that it arranges or provides for the navigation of available live television programming based on time of availability (i.e., air time) rather than based on identifier such as the titles of the multimedia programs. It is noteworthy that the peripheral nodes illustrated in EPG 100 are for illustrative purposes and are not meant to limit the scope of disclosed embodiments. For example without limitation, peripheral node 127-1 may have secondary components that are dates instead of times. In other words, peripheral node 127-1 and related secondary element nodes (e.g., secondary element node 127-2) may each correspond to a day. In accordance with disclosed embodiments, the number of secondary element nodes, the number of peripheral nodes, and the identity and type of secondary components associated with each may be chosen automatically using collaborative rating data, data inferred from viewing habits of the user of EPG 100, and other methods that attempt to predict what multimedia content the user of EPG 100 may like.

As shown, peripheral node 106-1 belongs to category 125-1 which, as shown, includes "friends" of the user, described as "Me" by identifier 120. Peripheral node 106-1 illustrates that it represents a secondary component that is a person named "Sally." Likewise, secondary element node 106-2 illustrates that represents a further secondary component that is a person named "Doug." Doug and Sally are friends of the user of EPG 100. By pressing a button on a remote control, for example an arrow button, user EPG 100 may navigate from peripheral node 104-1 to peripheral node 106-1. By pressing a select button on a remote control, for example, the user may thereby causing a new display to EPG view to appear on a display with a primary node labeled "friends," in which the primary component of the primary node is a group of friends of the user EPG 100. In a refreshed display, peripheral nodes would represent Sally, Doug, Fred, and Joe. In some embodiments, secondary components represent by peripheral nodes would be chosen automatically. For example, friends that are most commonly accessed by the user EPG 100 may be displayed first. In some embodiments, the user of EPG 100 may provide further input to expand or increase the number of friends represented by peripheral nodes in the new view. For example, the user may change criteria by which peripheral nodes are chosen. Accordingly, the user may request that "work friends" are included or "school friends" are included in the new display and represented by peripheral nodes.

The EPG 100 and FIG. 1 illustrates that peripheral node 104-1 is highlighted (i.e., bolded). Selection of peripheral node 104-1, in some embodiments, causes the secondary component (i.e., The O'Reilly Factor) to become the primary component represented by a primary node in a new display. In accordance with some embodiments, individual categories 125 may be highlighted and selected for further review, examination, research, and selection. For example, a user may navigate EPG 100 to highlight and select category 125-2. In response, a new display may appear with recommended programs that were recorded which, in accordance with EPG 100, would include peripheral nodes that represent secondary components: The O'Reilly Factor, The Shield, Will & Grace, and The Colbert Report.

Figure 2A:
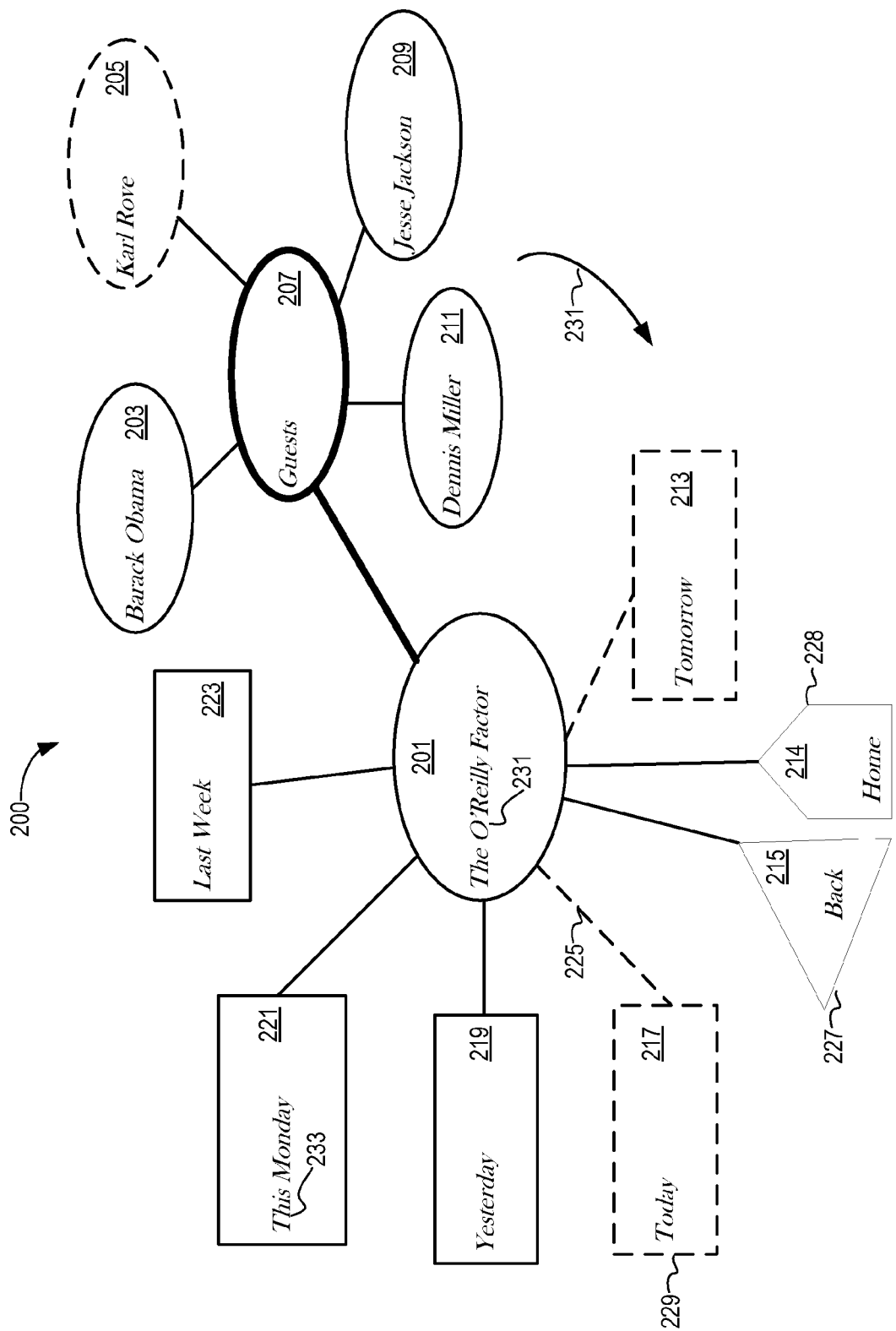
FIG. 2A illustrates a view that may appear in place of the view from FIG. 1 if a user selects the peripheral node that is highlighted (i.e., peripheral node 104-1) in FIG. 1.

FIG. 2A illustrates an EPG view 200 that may appear in place of the illustrated view from EPG 100 (FIG. 1) if a user selects peripheral node 104-1 that is highlighted in FIG. 1. As shown, primary node 201 represents a multimedia program titled "The O'Reilly Factor," which is indicated by identifier 231. In FIG. 1, peripheral node 104-1 belongs to category 125-2, which was a category of recorded multimedia programs. Accordingly, peripheral nodes to 223, 221, 219, 217, and 213 relate to episodes of The O'Reilly Factor that were recorded last week, this Monday, yesterday and that are scheduled to be recorded today and tomorrow. Peripheral node 221 includes an identifier 233 that is "This Monday" which indicates that peripheral node 221's secondary component includes any episode of The O'Reilly Factor recorded this Monday. As shown, peripheral node 217 has a graphical element 229 shown as a dashed box. Graphical element 229 is connected to primary node 201 through connector 225, which is shown as a dashed line. In this way, graphical element 229 and 225 are coded (i.e., dashed) to indicate that today's episode of The O'Reilly Factor is not yet recorded but is scheduled to be recorded. Similarly, peripheral node 213 indicates that tomorrow's episode of The O'Reilly Factor is scheduled to be recorded. Peripheral node 214 has a secondary component that corresponds to a home menu or homepage of an EPG (e.g., EPG 100 in FIG. 1) that includes EPG view 200. Peripheral node 215 allows a user to navigate back to the EPG view displayed in FIG. 1. As shown, peripheral node 215 is associated with graphical element 227 which is coded to indicate a backwards arrow. Likewise, peripheral node 214 is associated with graphical element 228 which is coded by its shape (i.e., a house shape) to indicate a home menu.

As shown in FIG. 2A, EPG view 200 includes peripheral node 207 which has a secondary component that includes guests that have appeared on The O'Reilly Factor. The configuration of EPG view 200 may be influenced by a "guest" field within metadata that is received with a multimedia stream that includes The O'Reilly Factor. Similarly, all of the information (e.g., identifiers, shape data, air date, collaborative ratings, group member ratings) that may be included in third order nodes 203, 205, 209, and 211 may be received with the multimedia stream that includes The Or other Factor. Alternatively, the metadata may be retrieved by disclosed embodiments and methods from third-party sources that operate independently from a service provider network that provides the streaming multimedia content that includes The O'Reilly Factor. In some embodiments, a service provider network that streams multimedia content including multimedia programs selectable by disclosed EPGs includes rudimentary EPG data, and more elaborate or detailed EPG data may be retrieved from third-party sources and integrated into disclosed EPGs.

As shown, peripheral node 207 is highlighted (i.e., bolded) and the user may navigate in the direction of arrow 231 by, for example, depressing a button on a remote control device. Alternatively, a user may rotate a finger on a touchscreen that illustrates a circle that corresponds to the radial fashion in which EPG view 200 and other EPG views are arranged. Roller balls, wheels, laser point devices, and motion detecting equipment may be incorporated into remote control devices to enable a user to provide user inputs to navigate EPG view 200. In some embodiments, a user rotates an EPG view at a first level (e.g., a peripheral node level or a category level) but may provide user input to navigate at a second level (e.g., a third order node level). Accordingly, a user may provide input to navigate EPG view 200 using successive assertions of a remote control button to alternate successively third order nodes 205, 209, 211, and 203. As shown, third order node 205 has a dashed graphical element, which may indicate that an episode in which Karl Rove is a guest on The O'Reilly Factor is scheduled to be recorded but has not yet been recorded.

In some embodiments a peripheral node or third order node may represent an actor (or genre, director, etc.) Disclosed EPGs permit a user to explore, by selecting the node, other multimedia programs in which the actor participated. Such data (e.g., actor data) may be received as metadata with a multimedia stream, may be accessed periodically from third-party sources, or may be accessed in real time in response to a user navigating a disclosed EPG. Disclosed EPGs may track the selections made while navigating views and store the information. The stored information may be analyzed to determine other multimedia content, products, or services to offer the user. Also, the information may be used to determine the content of future views of a EPG graph. For example, if a user nearly always explores the reviews of a movie (e.g., by navigation of nodes in an EPG to receive the reviews) then disclosed EPGs may, as a rule, provide nodes in EPG views, when appropriate, to provide easy links to reviews for all movies. In this way, disclosed embodiments may detect preferences of EPG users and adapt accordingly. In some embodiments, such information may be used to provide recommendations to other users. Also, statistics regarding the navigation paths of other EPGs may be used to decide what nodes within an EPG to present to a user. For example, if 90% of users navigate an EPG to view outtakes and deleted scenes of a movie (e.g., Borat), then disclosed EPGs may offer a node that provides easy navigation to the outtakes and deleted scenes. Therefore, disclosed EPGs utilize collaborative filtering data from the user and from others to decide what content to include within nodes of EPG views and to decide what content to offer users. Disclosed systems collect collaborative filtering data and are used for collaborative filtering. To accomplish this, user feedback (e.g., watching how a user explores an EPG graph) is utilized and the structure of the content and metadata are analyzed. In addition to metadata such as show titles and episodes, other metadata may be added, such as genre, actors, directors, and the like. Disclosed embodiments may use social network data (e.g., what a user's friends are watching) in combination with other data, such as a network of actors/actresses that have worked together, to make recommendations and otherwise populate an EPG graph.

Figure 2B:
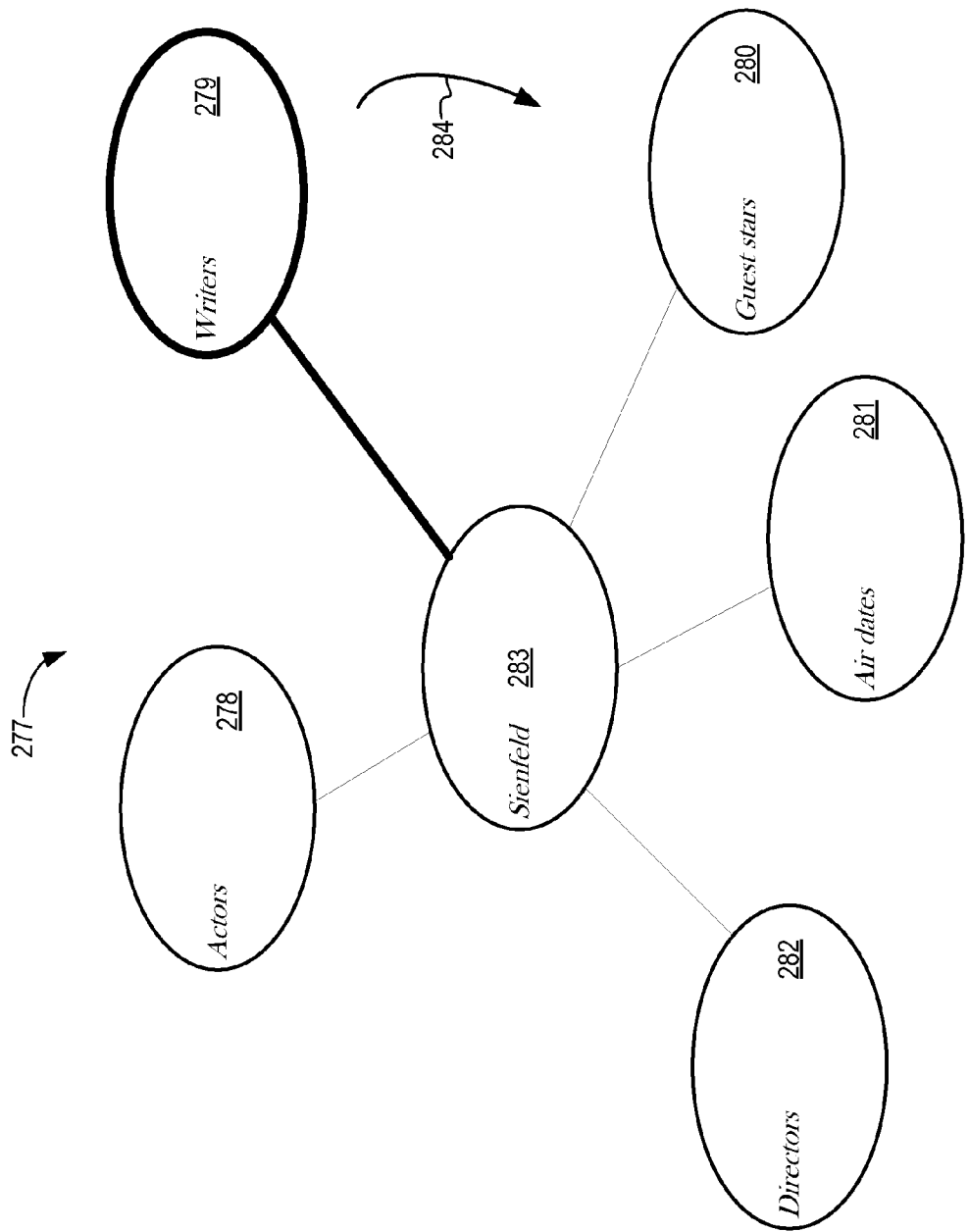
FIG. 2B illustrates a view that may appear in place of the view from FIG. 1 if a user selects peripheral node 109-1 in FIG. 1.

FIG. 2B illustrates an EPG view 277 that may appear in place of the view from FIG. 1 if a user selects peripheral node 109-1 in FIG. 1. As shown, primary node 283 represents and corresponds to a multimedia program titled, "Seinfeld." Secondary node 278 represents a secondary component that includes the actors from Seinfeld. Secondary node 279 represents a secondary component that includes writers that contribute to Seinfeld. Likewise, peripheral node 280 represents a secondary component that includes guest stars, secondary node 281 represents a secondary component that includes air dates of episodes of Seinfeld, and peripheral node 282 represents a secondary component that includes directors of Seinfeld. Peripheral node 279 is displayed as selectable in that it is highlighted. A user may navigate EPG view 277 in a direction indicated by arrow 284 (i.e., in a circular fashion) and cause peripheral node 280 to be highlighted and therefore selectable. As shown, peripheral nodes 278, 279, 280, 281, and 282 are arranged in a radial fashion around primary node 283.

Figure 3:
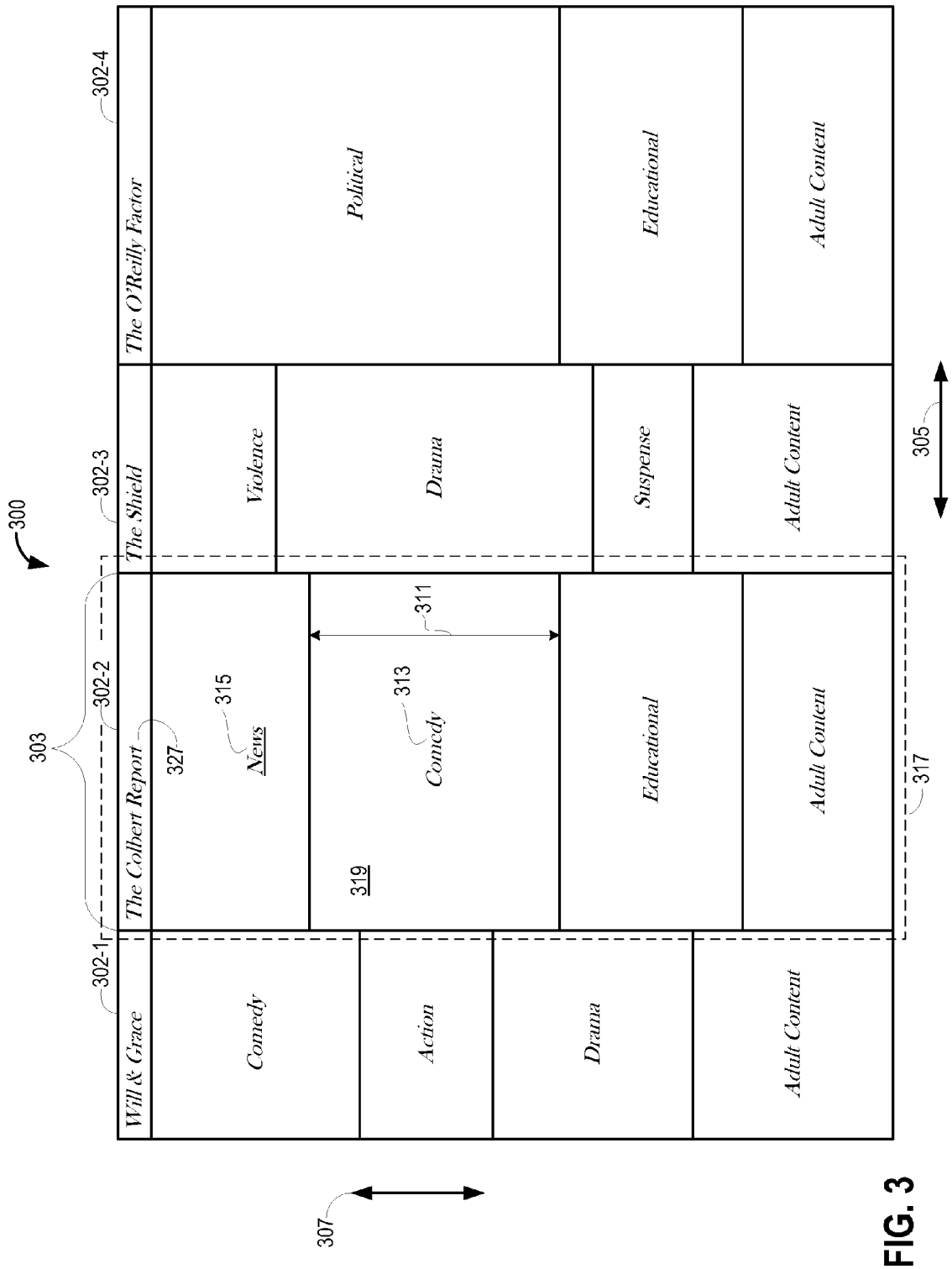
FIG. 3 illustrates a disclosed compact mosaic including several multimedia programs in which a multimedia program's column width corresponds to an overall rating and further blocks have a length that represents the degree to which the multimedia program belongs to a genre (e.g., news, comedy, educational)

FIG. 3 illustrates a mosaic 300 that may be included with or as an EPG in accordance with disclosed embodiments. As shown, mosaic 300 presents a plurality of graphical classification elements 302 that represents multimedia programs and contains data including, for example, rating data and classification data (e.g., according to genre). Graphical classification element 302-2 includes an identifier 327 with the text, "The Colbert Report." Accordingly, graphical classification element 302-2 corresponds to a multimedia program titled, "The Colbert Report." Mosaic 300 also includes graphical classification elements 302-1, 302-3, and 302-4 which correspond, respectively, to multimedia programs titled "Will & Grace," "The Shield," and "The O'Reilly Factor." Block 319 is an individual element of graphical classification element 302-2 that has width 303 (i.e., a first size in first dimension 305) that indicates a rating. In mosaic 300, the wider a graphical classification element and its blocks are, the more highly rated the corresponding multimedia program is. In mosaic 300, The Colbert Report is more highly rated than The Shield, which has a graphical classification element 302-3 that is narrower than graphical classification element 302-2 and block 319. As shown, individual elements (e.g., block 319) of graphical classification element 302-2 correspond to one of the plurality of genres. Block 319 corresponds to a genre 313 which is "Comedy." Another genre 315 within graphical classification element 302-2 is "News." As shown, block 319 has a height 311 (i.e., a second size in dimension 307) that indicates a degree to which The Colbert Report belongs to genre 313 (i.e., Comedy).

Data used for determining the height and width of block 319 may be collected from members of a collaborative group. The data may be collected from biometric sensors that detect reactions from the members of the collaborative group and indicate a degree to which the members enjoy the program. If a high degree of laughter is detected, and a program is listed as a comedy, the width of a graphical classification element may be very wide compared to others that correspond to programs in which a low degree of laughter was detected. Other data can be used, for example annotation data provided by collaborative group members. Collaborative crewmembers may also rate programs on a scale (e.g., a 1 to 10 scale), and this data may be integrated, synthesized, and processed to determine the width and height of blocks and graphical classification elements. Disclosed embodiments include methods of presenting EPGs in a novel fashion and methods of providing collaborative filtering that may be based on collaborative group member data. The collaborative group member data may be inferred from viewing habits of a user, viewing habits of a collaborative group member, or detected automatically from audio data, video data, haptic data, and other types of monitoring that may be used to determine the degree to which a user and members of a collaborative group like certain programming. Which multimedia programs appear in mosaic 300 and EPG 100 in FIG. 1 (e.g., as peripheral nodes) may be determined using collaborative filtering based on data obtained from collaborative group members. Advances in technology allow a user to choose from a massive number of pay-per-view, video-on-demand, streaming music, and other multimedia programs for consumption. Disclosed embodiments, methods, services, and data processing systems allow a user to be provided with an improved method of visualizing, navigating, and selecting available content. In addition, a user may be presented with content more likely to appeal to the user based on predictive analysis of the user's habits, likes, and dislikes and the habits, likes, and dislikes of other members of collaborative groups.

Figure 4:
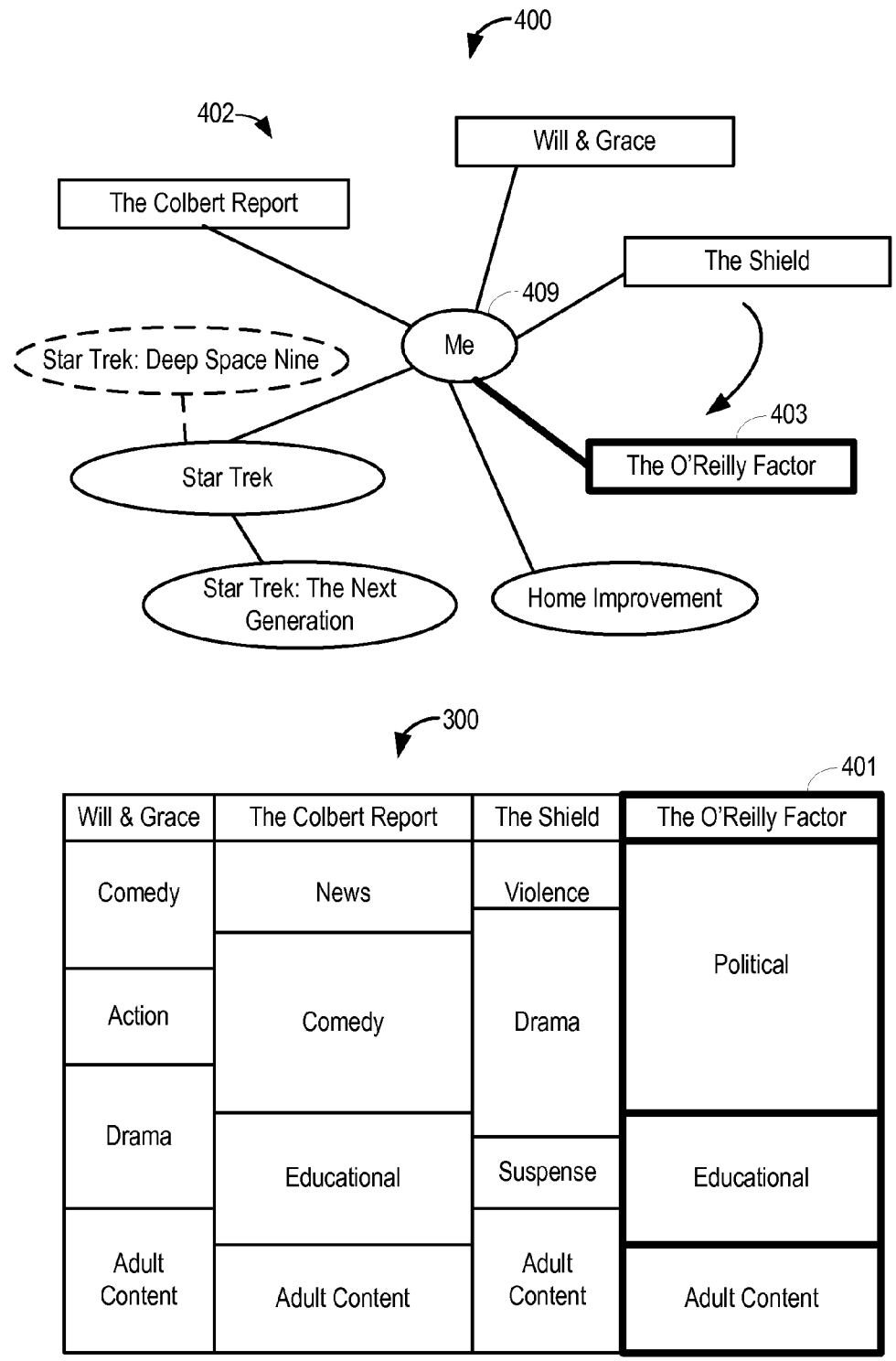
FIG. 4 depicts an EPG view that combines the view from FIG. 3 with a graphics based arrangement having a primary node and peripheral nodes.

FIG. 4 depicts an EPG view 400 that combines view 300 from FIG. 3 with a graphics based EPG element 402 having a primary node 409 and peripheral nodes (e.g. peripheral node 403) similar to those illustrated in EPG 100 (FIG. 1) and EPG view 200 (FIG. 2). As shown, peripheral node 403 is highlighted (i.e., bolded) and graphical characterization element 401 is also highlighted (i.e., bolded). As a user navigates graphics based EPG element 402 in a circular fashion, portions of view 300 (as combined with graphics based EPG element 402 as displayed in EPG view 400) may be highlighted so that peripheral nodes that represent a particular program are highlighted in EPG element 402 simultaneously with highlighting that appears in graphical characterization elements (in view 300) that correspond to the same program.

Figure 5:
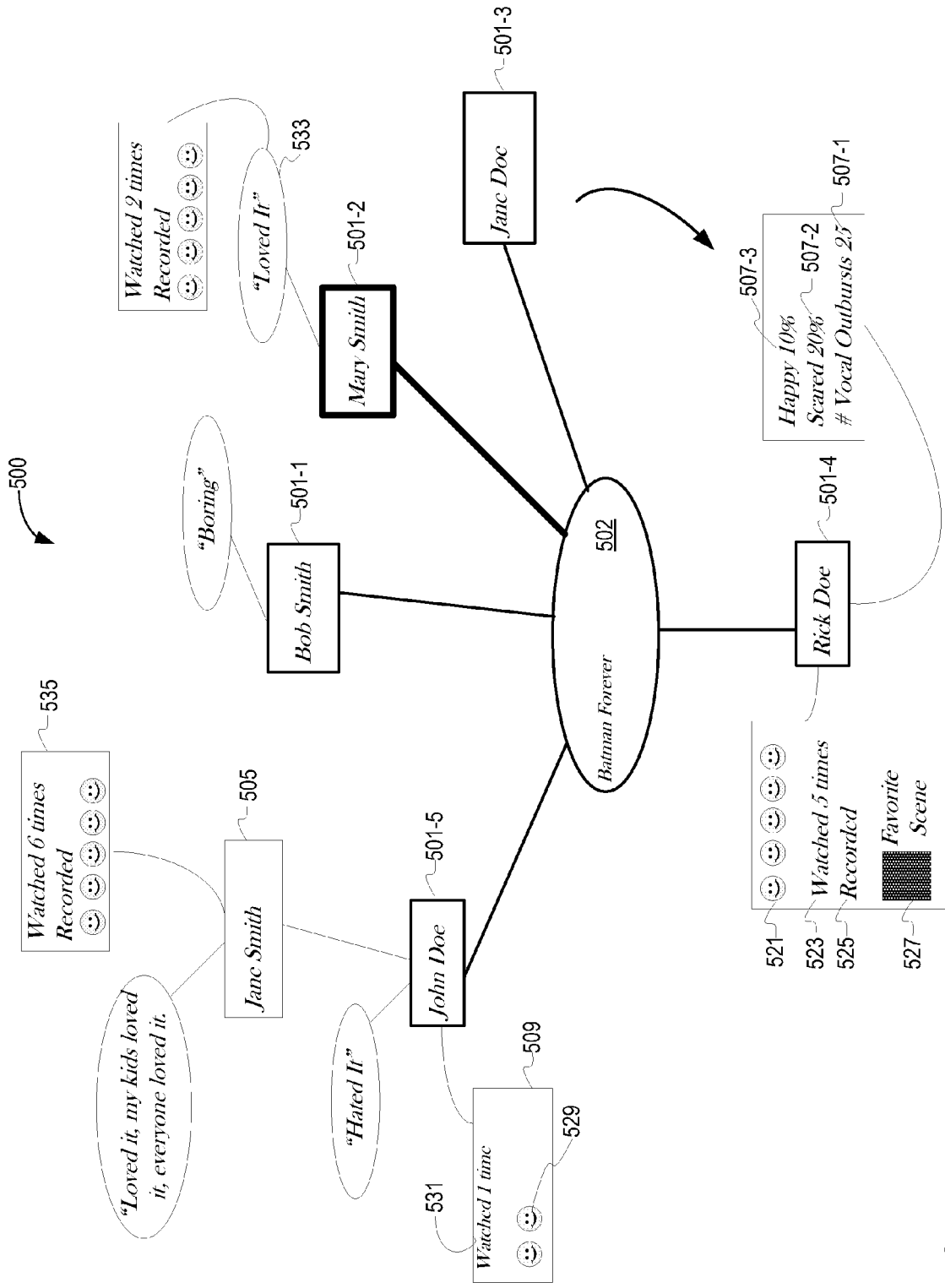
FIG. 5 depicts an EPG view with a primary node that indicates a movie and peripheral nodes that indicate members of a collaborative group, wherein third order nodes associated with the peripheral nodes include annotations and ratings associated with their respective members.

FIG. 5 depicts an EPG view 500 with a primary node 502 that represents a movie titled, "Batman Forever," which is primary node 502's primary element as disclosed herein. The peripheral nodes 501-1 through 501-5 belong to a "friends" category of a user of EPG 100 (FIG. 1), for example. As shown, peripheral node 501-3 has a secondary component that is a friend named "Jane Doe." Peripheral node 501-2 has a secondary component that is a friend named "Mary Smith." Extending from peripheral node 501-2 is an annotation 533 that includes the text "Loved It." Annotation 533 may be used by disclosed systems to predict whether a user of EPG 100 may like the primary element (i.e., Batman Forever) for primary node 502.

Peripheral node 501-5 represents a secondary component that is a friend named "John Doe." Connected to peripheral node 501-5 is a third order node 509 that includes collaborative rating data. As shown, rating data 529 shows two out of a possible of five smiley faces. This indicates that John Doe did not like Batman Forever. Collaborative data 531 may be automatically detected by disclosed systems and provided to the user of EPG view 500. As shown in collaborative data 531, John Doe watched Batman Forever one time. In contrast, Jane Smith, who is a friend of John Doe (represented by peripheral node 501-5) is represented by third order node 505. Associated with third order node 505, and therefore associated with Jane Smith (i.e., the tertiary element for third order node 505) is collaborative data 535. Collaborative data 535 indicates that Jane Smith watched Batman Forever six times and also recorded the movie. This information can be determined automatically from a service provider network or customer premises equipment (CPE) that monitors the viewing habits of Jane Smith. As shown, Jane Smith is a friend of John Doe, who is a friend of the user of EPG view 500. In this way, disclosed embodiments allow a user of a disclosed EPG to monitor the viewing habits of friends of friends (i.e., a friend's friends).

As shown in EPG view 500 (FIG. 5), peripheral node 501-4 has a secondary component that is a friend named Rick Doe. Connected to peripheral node 501-4 is a third order node with rating data 521 that shows five smiley faces. This indicates that Rick Doe enjoyed Batman Forever. Rating data 521 may have been expressly provided by Rick Doe. Alternatively, it may have been inferred from the behavior of Rick Doe as monitored while watching the program. Rating data 523 indicates that Rick Doe watched Batman Forever five times. Rating data 525 indicates that Rick Doe recorded the multimedia program. Element 527 is a selectable element that shows a favorite scene as chosen by Rick Doe. Alternatively, disclosed systems may infer a favorite scene in cases in which Rick Doe repeatedly watches one scene to the exclusion of other scenes. A further third order node coupled to peripheral node 501-4 includes data 507-1. As shown, data 507-1 contains information regarding the number (i.e., 25 outbursts) of vocal outbursts recorded during one or more viewings by Rick Doe of Batman Forever. Data 507-2 provides that Rick Doe was scared 20% of the time during a showing of Batman Forever. Data 507-2 may be derived from monitoring Rick Doe or the information for data 507-2 may be expressly provided by Rick Doe. Similarly, data 507-3 indicates that Rick Doe was happy 10% of the time during one or more showings of Batman Forever. Using EPG view 500, a user may determine what shows he or she may like based on collaborative ratings provided by friends or members of a collaborative group. In some cases, rating data may be inferred or come from biometric sensors, haptic data processors, subdermal sensors, video data, audio data, motion data, temperature data, ambient light data, and the like.

Figure 6:
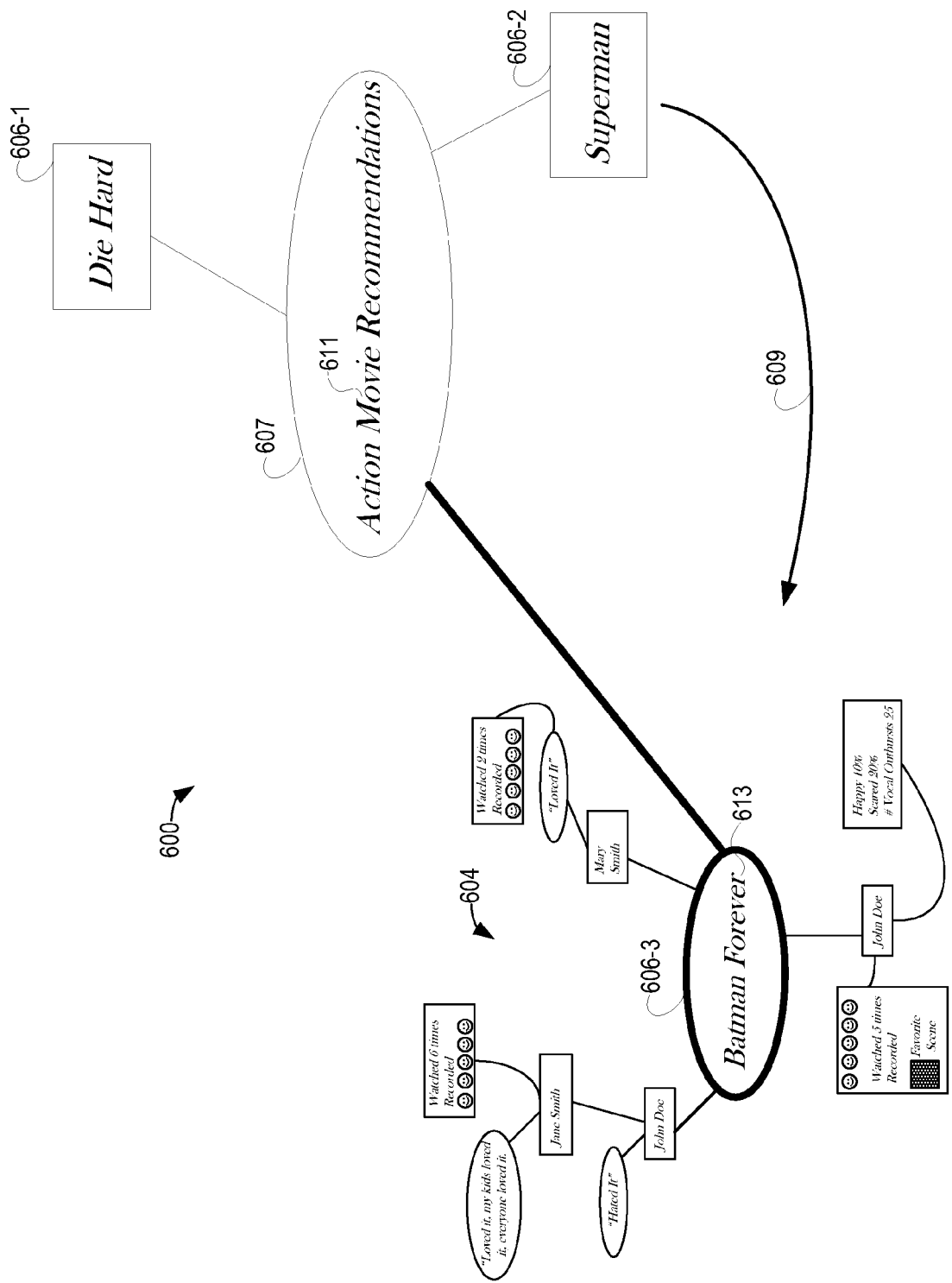
FIG. 6 depicts an EPG view showing action movie recommendations in a primary node and recommended movies in peripheral nodes.

FIG. 6 depicts EPG view 600 that provides a user with action movie recommendations. As shown, primary node 607 has a primary component which is described by identifier 611 as "Action Movie Recommendations." A user may be presented with EPG view 600 by selecting peripheral node 124 from FIG. 1. As shown, a user may navigate between peripheral node 606-2 and peripheral node 606-3 in a direction indicated by arrow 609. Similarly, a user may navigate from peripheral node 606-3, which as shown is highlighted as selectable, to peripheral node 606-1. Each peripheral node in EPG view 600 represents a secondary component that is a recommended action movie. Which movies are displayed as recommended action movies in EPG view 600 may be determined by predicting what movies a user of EPG view 600 may enjoy. Predictions of what movies a user of EPG view 600 may enjoy may be based on expressly entered rating data or inferred data. Peripheral node 606-3 has a secondary component that is the movie Batman Forever as indicated by identifier 613. As shown, EPG elements 604 may contain identical information or similar information as shown in EPG view 500 from FIG. 5. Thus, EPG elements 604 may provide a user with a preview of what type of data may be presented if he or she selects peripheral node 606-3 for further details and information. Upon selection of peripheral node 606-3, a new EPG view may be presented with information from peripheral node 606-3 shown as a new primary node and other data, some of which is shown in EPG elements 604, shown as peripheral nodes, third order nodes, and so on.

Figure 7:
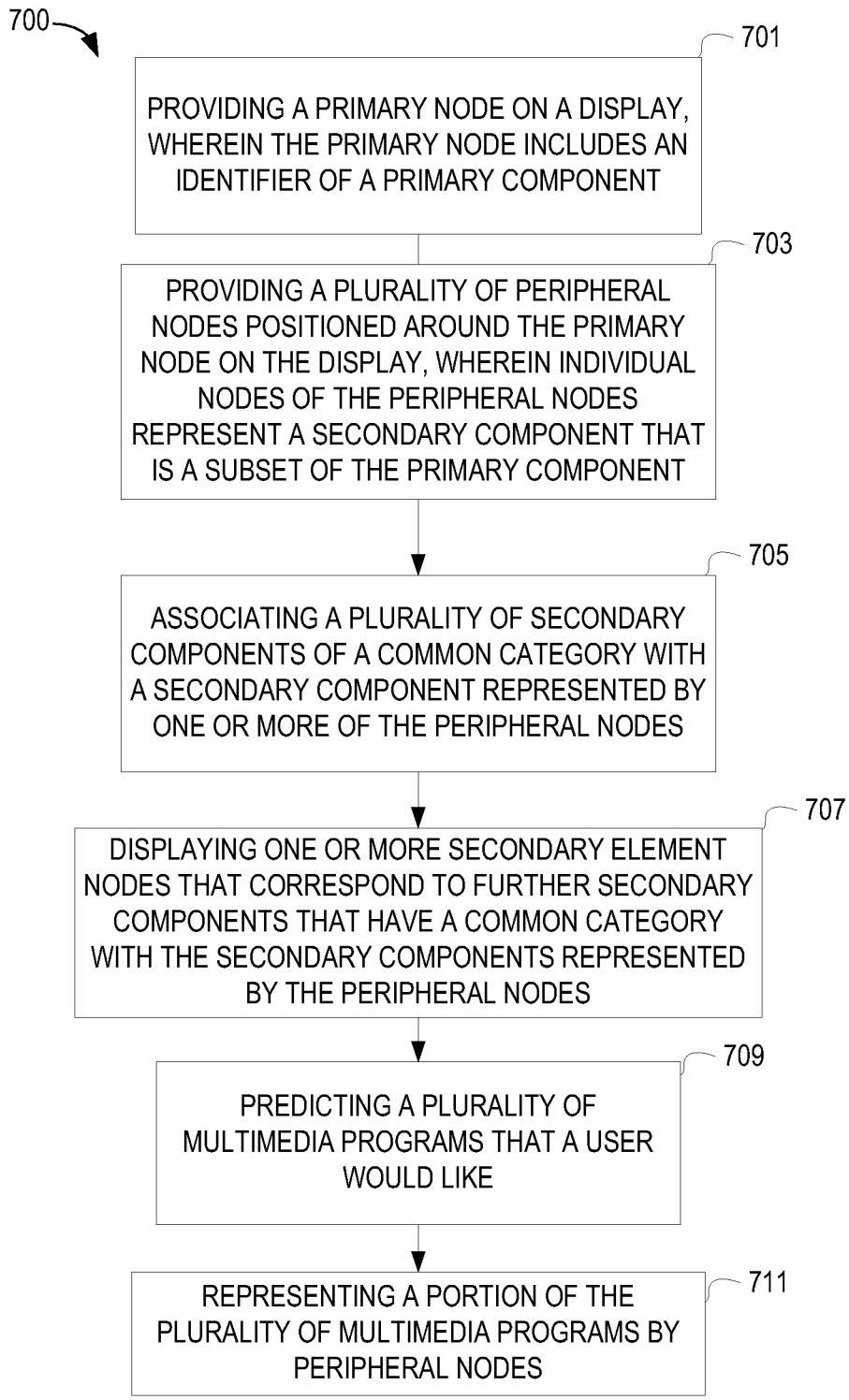
FIG. 7 is a flow diagram of selected elements of a disclosed method of providing an EPG.

FIG. 7 illustrates a method 700 of presenting an EPG for selecting a multimedia program. As shown, method 700 includes providing (block 701) a primary node on a display, providing (block 703) a plurality of peripheral nodes positioned around the primary node on the display, and associating (block 705) a plurality of secondary components of a common category with a secondary component represented by one or more of the peripheral nodes. The primary node includes an identifier of a primary component. In accordance with disclosed embodiments, the secondary components that are represented by the peripheral nodes are a subset of the primary component represented by the primary node. Method 700 further includes displaying (block 707) one or more secondary element nodes that correspond to further secondary components that have a common category with the secondary components represented by the peripheral nodes. Method 700 also includes predicting (block 709) a plurality of multimedia programs that a user of the EPG would like. Predicting may be based on the user's stated interest or preferences as compared to corresponding preferences of other members of a collaboration group. Further, predicting may be based on comparing the user's likes or dislikes, as determined from monitoring the viewing habits of the user over a period, to the likes and dislikes of other collaboration members whose viewing habits have been similarly monitored. Still further, predicting may be based on the recommendations of other collaboration members. Method 700 includes representing (block 711) a portion of a plurality of multimedia programs by peripheral nodes. In such cases, the portion of the plurality of multimedia programs are secondary components to one or more peripheral nodes.

Figure 8:
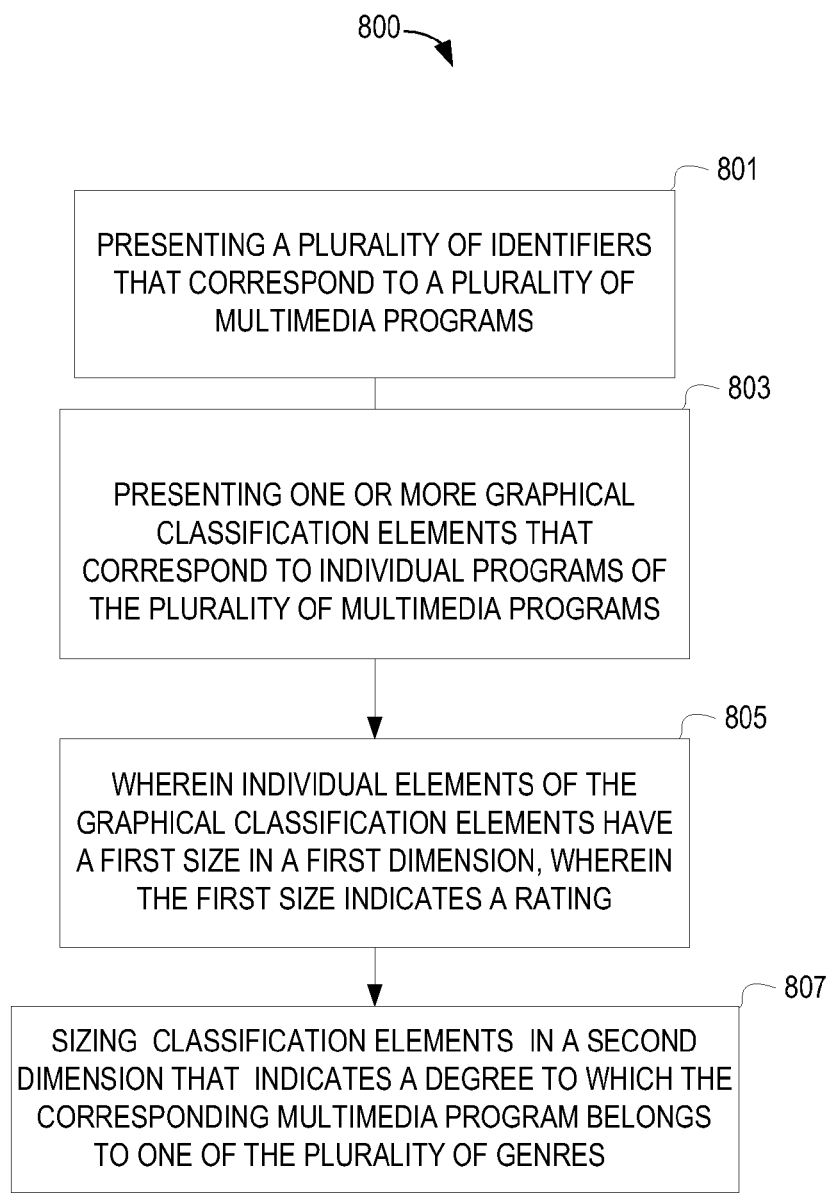
FIG. 8 is a flow diagram of selected elements of another disclosed method of providing an EPG that enables collaborative sketch annotating of multimedia content.

FIG. 8 illustrates a method 800 of presenting an EPG for viewing a selectable plurality of multimedia programs. The method includes presenting (block 801), on a display, a plurality of identifiers (e.g., identifier 327 in FIG. 3) that correspond to a plurality of multimedia programs (e.g., The Colbert Report in FIG. 3). The method further includes presenting (block 803) one or more graphical classification elements (e.g. classification element 317 in FIG. 3) that correspond to individual programs of the plurality of multimedia programs. The graphical classification elements may include a block (e.g., block 319 in FIG. 3) or series of blocks in a compact mosaic (e.g., mosaic 300 in FIG. 3) that corresponds to a multimedia program (e.g., The Colbert Report shown as item 302-2 in FIG. 3). In accordance with the method 800, individual elements (e.g., block 319 in FIG. 3) of the graphical classification elements have (block 805 in method 800) a first size (e.g., width 303 in FIG. 3) in a first dimension (e.g., dimension 305 in FIG. 3), wherein the first size indicates a rating. Further in accordance with method 800, individual elements (e.g., block 319 in FIG. 3) of the graphical classification elements are sized (block 807 in method 800) in a second dimension (e.g., dimension 307 in FIG. 3) that indicates a degree to which the corresponding multimedia program belongs to one of a plurality of genres or other categories. Accordingly, as shown in FIG. 3, block 319 has a height 311 that is larger than other such blocks for "news," "educational," and "adult content." This relative sizing of block 319 in the direction of dimension 307 indicates that The Colbert Report is more a comedy than it is a news show, than it is an educational program, or than it is a program that contains adult content.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a user's CPE and a service provider's equipment. Bidirectional communication allows a service provider to deploy advanced features, such as VOD, pay-per-view, advanced programming information (e.g., sophisticated and customizable EPGs), and the like. Bidirectional networks may also enable a service provider to collect information related to a user's preferences, whether for purposes of providing preference-based features to the user, providing potentially valuable information to service providers, or providing potentially lucrative information to content providers and others.

Figure 9:
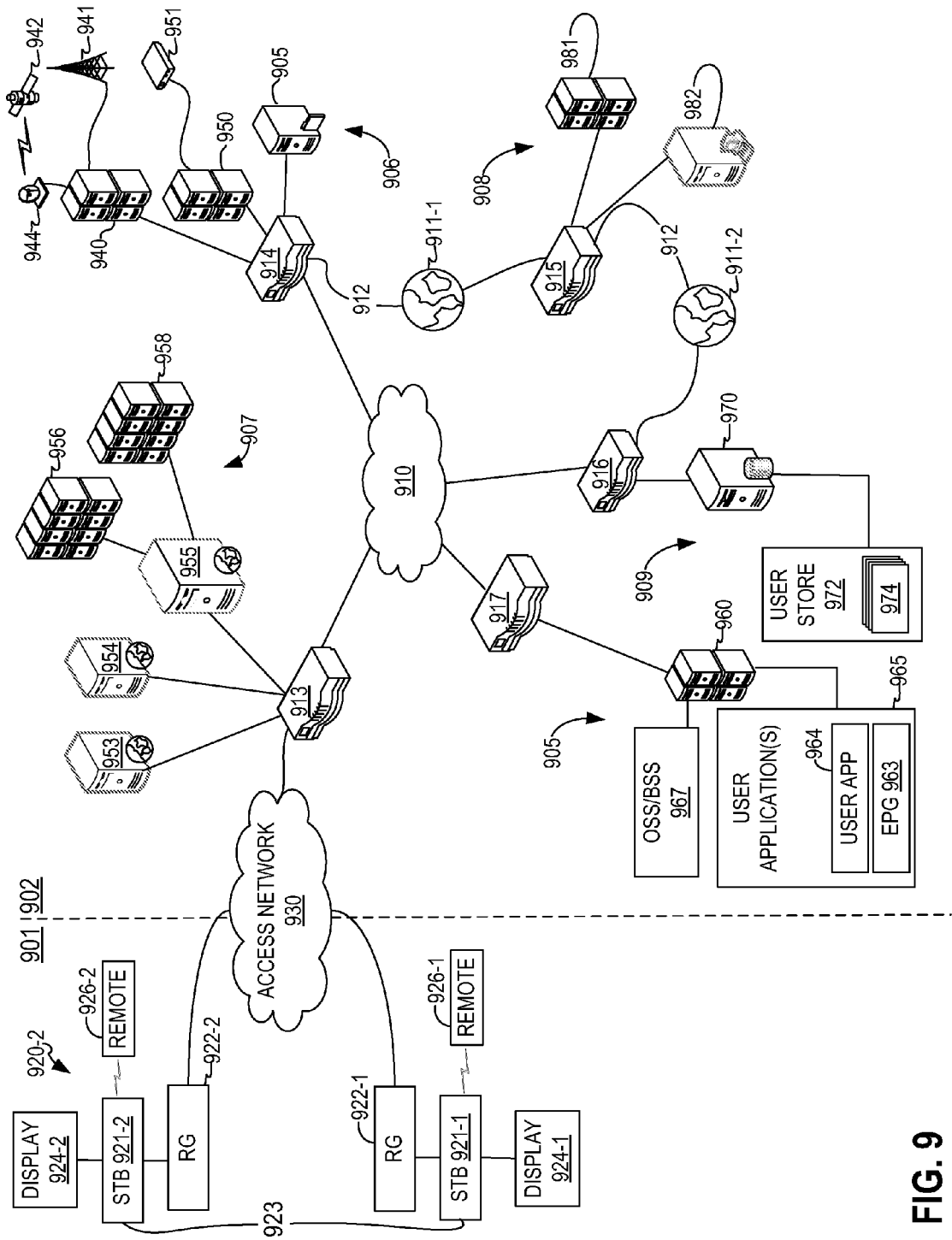
FIG. 9 illustrates a representative Internet Protocol Television (IPTV) architecture for providing disclosed EPGs and collecting, processing, and using collaborative rating data and implementing collaborative filtering of EPG elements and programming.

Referring now to the drawings, FIG. 9 illustrates selected aspects of a multimedia content distribution network (MCDN) 900 for providing EPGs in accordance with disclosed embodiments. MCDN 900, as shown, is a multimedia content provider network that may be generally divided into a client side 901 and a service provider side 902 (a.k.a., server side 902). Client side 901 includes all or most of the resources depicted to the left of access network 930 while server side 902 encompasses the remainder.

Client side 901 and server side 902 are linked by access network 930. In embodiments of MCDN 900 that leverage telephony hardware and infrastructure, access network 930 may include the "local loop" or "last mile," which refers to the physical cables that connect a subscriber's home or business to a local exchange. In these embodiments, the physical layer of access network 930 may include varying ratios of twisted pair copper cables and fiber optics cables. In a fiber to the curb (FTTC) access network, the last mile portion that employs copper is generally less than approximately 300 miles in length. In fiber to the home (FTTH) access networks, fiber optic cables extend all the way to the premises of the subscriber.

Access network 930 may include hardware and firmware to perform signal translation when access network 930 includes multiple types of physical media. For example, an access network that includes twisted-pair telephone lines to deliver multimedia content to consumers may utilize DSL. In embodiments of access network 930 that implement FTTC, a DSL access multiplexer (DSLAM) may be used within access network 930 to transfer signals containing multimedia content from optical fiber to copper wire for DSL delivery to consumers.

Access network 930 may transmit radio frequency (RF) signals over coaxial cables. In these embodiments, access network 930 may utilize quadrature amplitude modulation (QAM) equipment for downstream traffic. In these embodiments, access network 930 may receive upstream traffic from a consumer's location using quadrature phase shift keying (QPSK) modulated RF signals. In such embodiments, a cable modem termination system (CMTS) may be used to mediate between IP-based traffic on private network 910 and access network 930.

Services provided by the server side resources as shown in FIG. 9 may be distributed over a private network 910. In some embodiments, private network 910 is referred to as a "core network." In at least some embodiments, private network 910 includes a fiber optic wide area network (WAN), referred to herein as the fiber backbone, and one or more video hub offices (VHOs). In large-scale implementations of MCDN 900, which may cover a geographic region comparable, for example, to the region served by telephony-based broadband services, private network 910 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 910, as shown in FIG. 9, are connected together with a plurality of network switching and routing devices referred to simply as switches 913 through 917. The depicted switches include client facing switch 913, acquisition switch 914, operations-systems-support/business-systems-support (OSS/BSS) switch 915, database switch 916, and an application switch 917. In addition to providing routing/switching functionality, switches 913 through 917 preferably include hardware or firmware firewalls, not depicted, that maintain the security and privacy of network 910. Other portions of MCDN 900 may communicate over a public network 912, including, for example, Internet or other type of web-network where the public network 912 is signified in FIG. 9 by the World Wide Web icons 911.

As shown in FIG. 9, client side 901 of MCDN 900 depicts two of a potentially large number of client side resources referred to herein simply as client(s) 920. Each client 920, as shown, includes an STB 921, a residential gateway (RG) 922, a display 924, and a remote control device 926. In the depicted embodiment, STB 921 communicates with server side devices through access network 930 via RG 922.

As shown in FIG. 9, RG 922 may include elements of a broadband modem such as a DSL or cable modem, as well as elements of a firewall, router, and/or access point for an Ethernet or other suitable local area network (LAN) 923. In this embodiment, STB 921 is a uniquely addressable Ethernet compliant device. In some embodiments, display 924 may be any National Television System Committee (NTSC) and/or Phase Alternating Line (PAL) compliant display device. Both STB 921 and display 924 may include any form of conventional frequency tuner. Remote control device 926 communicates wirelessly with STB 921 using infrared (IR) or RF signaling. STB 921-1 and STB 921-2, as shown, may communicate through LAN 923 in accordance with disclosed embodiments for sharing collaborative rating data between group members.

In IPTV compliant implementations of MCDN 900, clients 920 are configured to receive packet-based multimedia streams from access network 930 and process the streams for presentation on displays 924. In addition, clients 920 are network-aware resources that may facilitate bidirectional-networked communications with server side 902 resources to support network hosted services and features. Because clients 920 are configured to process multimedia content streams while simultaneously supporting more traditional web-like communications, clients 920 may support or comply with a variety of different types of network protocols including streaming protocols such as real-time transport protocol (RTP) over user datagram protocol/internet protocol (UDP/IP) as well as web protocols such as hypertext transport protocol (HTTP) over transport control protocol (TCP/IP).

The server side 902 of MCDN 900 as depicted in FIG. 9 emphasizes network capabilities including application resources 905, which may have access to database resources 909, content acquisition resources 906, content delivery resources 907, and OSS/BSS resources 908.

Before distributing multimedia content to users, MCDN 900 first obtains multimedia content from content providers. To that end, acquisition resources 906 encompass various systems and devices to acquire multimedia content, reformat it when necessary, and process it for delivery to subscribers over private network 910 and access network 930.

Acquisition resources 906 may include, for example, systems for capturing analog and/or digital content feeds, either directly from a content provider or from a content aggregation facility. Content feeds transmitted via VHF/UHF broadcast signals may be captured by an antenna 941 and delivered to live acquisition server 940. Similarly, live acquisition server 940 may capture downlinked signals transmitted by a satellite 942 and received by a parabolic dish 944. In addition, live acquisition server 940 may acquire programming feeds transmitted via high-speed fiber feeds or other suitable transmission means. Acquisition resources 906 may further include signal conditioning systems and content preparation systems for encoding content.

As depicted in FIG. 9, content acquisition resources 906 include a VOD acquisition server 950. VOD acquisition server 950 receives content from one or more VOD sources that may be external to the MCDN 900 including, as examples, discs represented by a DVD player 951, or transmitted feeds (not shown). VOD acquisition server 950 may temporarily store multimedia content for transmission to a VOD delivery server 958 in communication with client-facing switch 913.

Content delivery resources 907, as shown in FIG. 9, are in communication with private network 910 via client facing switch 913. In the depicted implementation, content delivery resources 907 include a content delivery server 955 in communication with a live or real-time content server 956 and a VOD delivery server 958. For purposes of this disclosure, the use of the term "live" or "real-time" in connection with content server 956 is intended primarily to distinguish the applicable content from the content provided by VOD delivery server 958. The content provided by a VOD server is sometimes referred to as time-shifted content to emphasize the ability to obtain and view VOD content substantially without regard to the time of day or the day of week.

Content delivery server 955, in conjunction with live content server 956 and VOD delivery server 958, responds to user requests for content by providing the requested content to the user. The content delivery resources 907 are, in some embodiments, responsible for creating video streams that are suitable for transmission over private network 910 and/or access network 930. In some embodiments, creating video streams from the stored content generally includes generating data packets by encapsulating relatively small segments of the stored content according to the network communication protocol stack in use. These data packets are then transmitted across a network to a receiver (e.g., STB 921 of client 920), where the content is parsed from individual packets and re-assembled into multimedia content suitable for processing by a decoder.

User requests received by content delivery server 955 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 926 to send a signal to STB 921 indicating a request for the particular channel. When STB 921 responds to the remote control signal, the STB 921 changes to the requested channel by transmitting a request that includes an indication of the network endpoint associated with the desired channel to content delivery server 955.

Content delivery server 955 may respond to such requests by making a streaming video or audio signal accessible to the user. Content delivery server 955 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 955 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 930 to clients 920.

As illustrated in FIG. 9, a client-facing switch 913 provides a conduit between client side 901, including client 920, and server side 902. Client-facing switch 913, as shown, is so-named because it connects directly to the client 920 via access network 930 and it provides the network connectivity of IPTV services to users' locations. To deliver multimedia content, client-facing switch 913 may employ any of various existing or future Internet protocols for providing reliable real-time streaming multimedia content. In addition to the TCP, UDP, and HTTP protocols referenced above, such protocols may use, in various combinations, other protocols including, RTP, real-time control protocol (RTCP), file transfer protocol (FTP), and real-time streaming protocol (RTSP), as examples.

In some embodiments, client-facing switch 913 routes multimedia content encapsulated into IP packets over access network 930. For example, an MPEG-2 transport stream may be sent, in which the transport stream consists of a series of 988-byte transport packets, for example. Client-facing switch 913, as shown, is coupled to a content delivery server 955, acquisition switch 914, applications switch 917, a client gateway 953, and a terminal server 954 that is operable to provide terminal devices with a connection point to the private network 910. Client gateway 953 may provide subscriber access to private network 910 and the resources coupled thereto.

In some embodiments, STB 921 may access MCDN 900 using information received from client gateway 953. Subscriber devices may access client gateway 953 and client gateway 953 may then allow such devices to access the private network 910 once the devices are authenticated or verified. Similarly, client gateway 953 may prevent unauthorized devices, such as hacker computers or stolen STBs, from accessing the private network 910. Accordingly, in some embodiments, when an STB 921 accesses MCDN 900, client gateway 953 verifies subscriber information by communicating with user store 972 via the private network 910. Client gateway 953 may verify billing information and subscriber status by communicating with an OSS/BSS gateway 967. OSS/BSS gateway 967 may transmit a query to the OSS/BSS server 981 via an OSS/BSS switch 915 that may be connected to a public network 912. Upon client gateway 953 confirming subscriber and/or billing information, client gateway 953 may allow STB 921 access to IPTV content, VOD content, and other services. If client gateway 953 cannot verify subscriber information (i.e., user information) for STB 921, for example, because it is connected to an unauthorized local loop or RG, client gateway 953 may block transmissions to and from STB 921 beyond the private access network 930. OSS/BSS server 981 hosts operations support services including remote management via a management server 982. OSS/BSS resources 908 may include a monitor server (not depicted) that monitors network devices within or coupled to MCDN 900 via, for example, a simple network management protocol (SNMP).

MCDN 900, as depicted, includes application resources 905, which communicate with private network 910 via application switch 917. Application resources 905 as shown include an application server 960 operable to host or otherwise facilitate one or more subscriber applications 965 that may be made available to system subscribers. For example, subscriber applications 965 as shown include an EPG application 963. Subscriber applications 965 may include other applications as well. In addition to subscriber applications 965, application server 960 may host or provide a gateway to operation support systems and/or business support systems. In some embodiments, communication between application server 960 and the applications that it hosts and/or communication between application server 960 and client 920 may be via a conventional web based protocol stack such as HTTP over TCP/IP or HTTP over UDP/IP.

Application server 960 as shown also hosts an application referred to generically as user application 964. User application 964 represents an application that may deliver a value added feature to a user, who may be a subscriber to a service provided by MCDN 900. For example, in accordance with disclosed embodiments, user application 964 may be an application that harvests, processes, or distributes rating data from viewers or alternatively, may be an application that presents embodied EPGs to viewers to permit collaborative filters and intuitive navigation. User application 964, as illustrated in FIG. 9, emphasizes the ability to extend the network's capabilities by implementing a network-hosted application. Because the application resides on the network, it generally does not impose any significant requirements or imply any substantial modifications to client 920 including STB 921. In some instances, an STB 921 may require knowledge of a network address associated with user application 964, but STB 921 and the other components of client 920 are largely unaffected.

As shown in FIG. 9, a database switch 916, as connected to applications switch 917, provides access to database resources 909. Database resources 909 include a database server 970 that manages a system storage resource 972, also referred to herein as user store 972. User store 972, as shown, includes one or more user profiles 974 where each user profile includes account information and may include preferences information that may be retrieved by applications executing on application server 960 including user applications 965.

Figure 10:
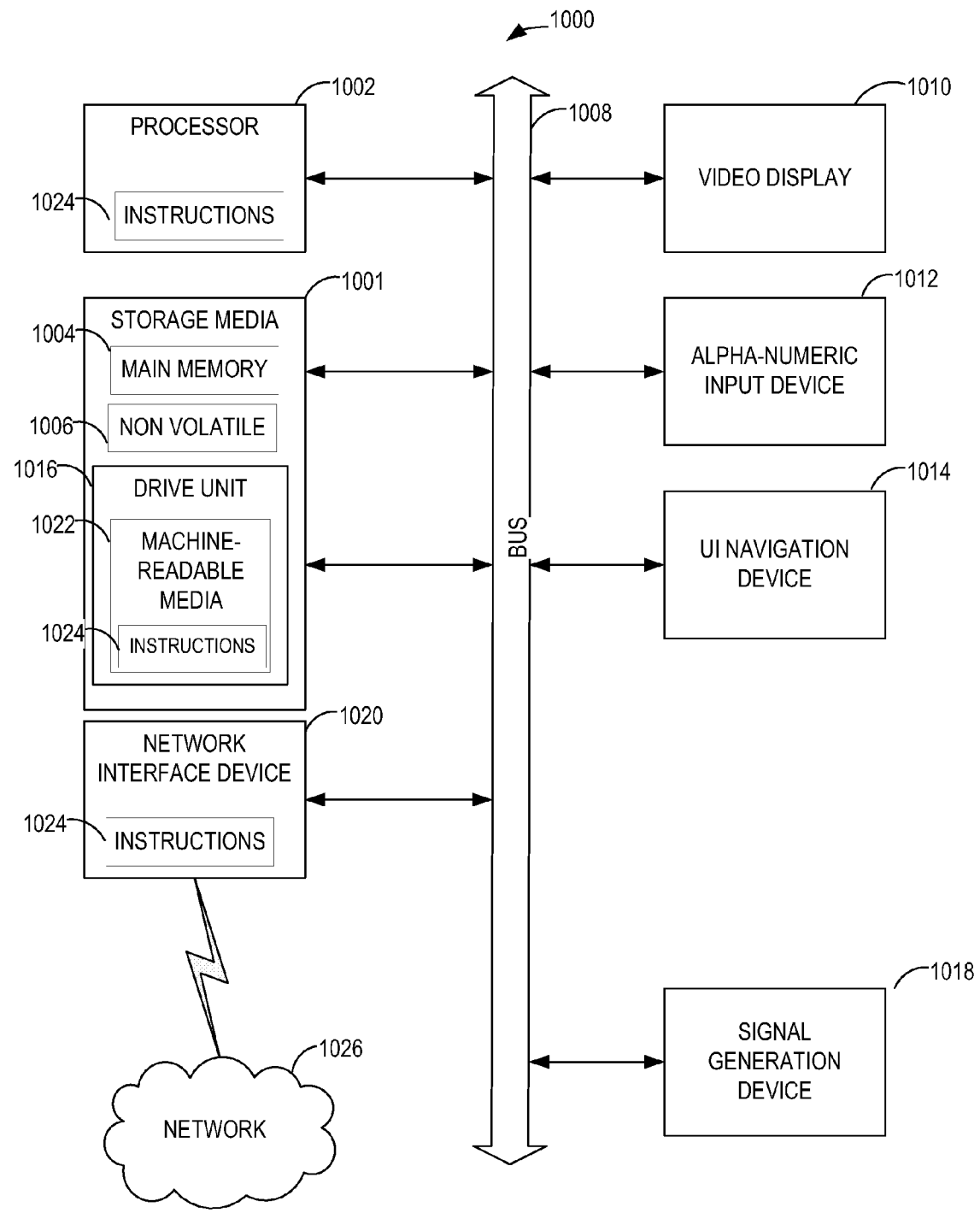
FIG. 10 depicts a data processing system that may be used in accordance with disclosed embodiments to provide disclosed EPGs, collect social collaborative data, and provide available multimedia programs to a user that may be filtered according to rating data.

FIG. 10 illustrates, in block diagram form, selected elements of an embodiment of a data processing system 1000 within which a set of instructions may operate to perform one or more of the methodologies discussed herein. Data processing system 1000 may operate as a standalone device or may be connected (e.g., networked) to other data processing systems. In a networked deployment, data processing system 1000 may operate in the capacity of a server or a client data processing system in a server-client network environment, or as a peer computer in a peer-to-peer (or distributed) network environment. Example data processing systems include, but are not limited to, an encoder, a digital video recorder, a personal computer (PC), a tablet PC, an STB, a cable box, a satellite box, an EPG box, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown in FIG. 10, data processing system 1000 includes a processor 1002 (e.g., a central processing unit, a graphics processing unit, or both) and storage media 1001 that includes a main memory 1004 and a non-volatile memory 1006, and a disc drive unit 1016 that may communicate with each other via a bus 1008. In some embodiments, the main memory 1004 and/or the non-volatile memory 1006 may be used to store the indicators or values that relate to multimedia content accessed or requested by a consumer. Data processing system 1000 may further include a video display unit 1010 (e.g., a television, a liquid crystal display or a cathode ray tube) on which to display multimedia content such as the presentation of textual information (e.g., song lyrics) for a song, pay-per-view sporting events, television programs, VOD movies, and the like. Data processing system 1000 also includes an alphanumeric input device 1012 (e.g., a keyboard), a user interface (UI) navigation device 1014 (e.g., a remote control or a mouse), a signal generation device 1018 (e.g., a speaker) and a network interface device 1020. The input device 1012 and/or the UI navigation device 1014 (e.g., the remote control) may include a processor (not shown), and a memory (not shown). The disk drive unit 1016 includes a magnetic or solid state machine-readable medium 1022 that may have stored thereon one or more sets of instructions 1024 and data structures not depicted embodying or utilized by any one or more of the methodologies or functions described herein. The instructions 1024 may also reside, completely or at least partially, within the main memory 1004, within non-volatile memory 1006, within network interface device 1020, and/or within the processor 1002 during execution thereof by the data processing system 1000.

The instructions 1024 may be transmitted or received over a network 1026 (e.g., a multimedia content provider) via the network interface device 1020 utilizing any one of a number of transfer protocols (e.g., broadcast transmissions, HTTP). While the machine-readable medium 1022 is depicted as a single medium, the term "machine-readable medium" should be taken to include a single medium or multiple media (e.g., a centralized or distributed database, and/or associated caches and servers) that store the one or more sets of instructions.

The term "machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding, or carrying data structures utilized by or associated with such a set of instructions. The term "machine-readable medium" shall accordingly be taken to include, but not be limited to, solid-state memories, optical and magnetic media.

In accordance with some embodiments, instructions 1024 are stored on at least one computer readable media and enable data processing system 1000 to present a primary node on a display, wherein the primary node includes an identifier that represents a primary component. Further instructions 1024 present a plurality of peripheral nodes on the display around the primary node, wherein a portion of the plurality of peripheral nodes represent secondary components that belong to a subset of the primary component. Still further instructions 1024, in some embodiments, are responsive to a user selecting a peripheral node to refresh the display to provide the selected peripheral node as a further primary node, present a further plurality of peripheral nodes on the display, wherein individual nodes of the further peripheral nodes represent further secondary components that are a subset of a component represented by the further primary node. In some embodiments, further instructions 1024 present at least one third order node associated with one or more of the plurality of peripheral nodes, wherein at least one individual node of the at least one third order node represents a tertiary component that belongs to a subset of a secondary component represented by the one or more of the plurality of peripheral nodes.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A method of presenting electronic programming guide information for selecting a multimedia program, the method comprising:
   responsive to a first input from a user, displaying a first electronic programming guide interface, the first electronic programming guide interface including:
      a first primary node, wherein the first primary node represents the user;
      a first set of secondary nodes positioned along a first axis extending radially from the first primary node, wherein each of the first set of secondary nodes identifies a corresponding multimedia program available for selection by the user; and
      a second set of secondary nodes positioned along a second axis extending radially from the first primary node, wherein each of the second set of secondary nodes identifies a corresponding category of multimedia programs;
   responsive to a second input indicating a selected secondary node in the first set of secondary nodes, displaying a second electronic programming guide interface, the second electronic programming guide interface including a second primary node identifying a multimedia program corresponding to the selected secondary node and a set of subordinate nodes positioned on different radii extending from the second primary node; and
   responsive to a second input indicating a selected secondary node in the second set of secondary nodes, displaying a third electronic programming guide interface, the third electronic programming guide interface identifying multimedia programs belonging to the category corresponding to the selected secondary node;
   wherein at least one of the first set of secondary nodes and the second set of secondary nodes is displayed as a compact mosaic and further wherein the compact mosaic comprises a rectangular table including a plurality of graphical classification elements, each graphical classification element comprising a column of the rectangular table, each column representing a corresponding multimedia program and wherein each global classification element includes a plurality of blocks, each block within a graphical classification element corresponding to a different genre, wherein a first dimension of each block conveys a rating of the corresponding multimedia program and a second dimension of each block conveys a degree to which the corresponding multimedia program belongs to the corresponding genre.

2. The method of claim 1, wherein the width of the compact mosaic indicates an overall rating for the corresponding multimedia program available for selection by the user.

3. The method of claim 1, wherein the compact mosaic includes a plurality of genre blocks corresponding to a plurality of genres wherein lengths of the genre blocks indicate the extent to which corresponding genres are associated with the corresponding multimedia program available for selection by the user.

4. The method of claim 2, wherein the first electronic programming guide interface includes a third set of secondary nodes positioned along a third axis extending radially from the first primary node, wherein each of the third set of secondary nodes identifies a corresponding multimedia program available for selection by the user, wherein each of the third set of secondary nodes corresponds to a recorded multimedia program.

5. The method of claim 1, wherein the corresponding category of multimedia programs identified by one of the second set of secondary nodes includes multimedia programs viewed by a plurality of group members.

6. The method of claim 4, further comprising presenting the user with an indication of which multimedia programs are predicted to be more applicable to the user.

7. The method of claim 6, further comprising ordering a plurality of the first set of secondary nodes according to rating data.

8. The method of claim 7, wherein the rating data is estimated from a plurality of viewing habits obtained from a plurality of group members.

9. The method of claim 7, further comprising:
   predicting a plurality of multimedia programs that the user may like; and
   representing a portion of the plurality of multimedia programs by peripheral nodes.

10. The method of claim 1, wherein:
    shapes of individual nodes of the first set of secondary nodes indicate ratings.

11. The method of claim 10, wherein:
    each of the second set of secondary nodes represents one of a plurality of genres.

12. The method of claim 1, wherein:
    each of the second set of secondary nodes identifies a corresponding time slot.

13. The method of claim 1, wherein the subordinate nodes identify an air date associated with the multimedia program corresponding to the selected secondary node.

14. The method of claim 1, wherein the subordinate nodes identify ratings associated with the multimedia program corresponding to the selected secondary node.

15. The method of claim 1, further comprising:
coding at least one of the first set of secondary nodes to indicate a quality.

16. The method of claim 15, wherein the coding includes color coding.

17. The method of claim 15, wherein the coding includes shape coding.

18. The method of claim 1, wherein a third set of secondary nodes identifies a member of a social network group to which the user belongs.

19. The method of claim 18, further comprising, responsive to a user input indicating a selected member of the social network group, displaying information indicative of a rating of a multimedia program by the selected member.

20. The method of claim 19, further comprising displaying a rating derived from a plurality of members of the social network group.

21. A data processing system suitable for use in a multimedia content delivery network, the system comprising:
a processor; and
a computer readable storage medium including stored, processor executable instructions that, when executed by the processor, cause the processor to perform operations comprising:
responding to a first input from a user by displaying a first electronic programming guide interface, the first electronic programming guide interface including:
a first primary node representing multimedia content available to the user;
a first set of secondary nodes positioned along a first axis extending radially from the first primary node, wherein each of the first set of secondary nodes identifies a corresponding multimedia program available for selection by the user;
a second set of secondary nodes positioned along a second axis extending radially from the first primary node, where each of the second set of secondary nodes identifies a corresponding category of multimedia programs; and
a third set of secondary nodes positioned along a third axis extending radially from the first primary node, wherein the third set of secondary nodes identifies individuals associated with the user; and
responding to a second input from a user, the second input identifying a selected multimedia program from the first set of secondary nodes, by displaying a subordinate interface, the subordinate interface including:
a subordinate primary node identifying the selected multimedia program;
a set of metadata nodes, each identifying a category of metadata associated with the selected multimedia program; and
a set of secondary nodes, each identifying persons associated with the user;
wherein at least one of the first set of secondary nodes and the second set of secondary nodes is displayed as a compact mosaic and further wherein the compact mosaic comprises a rectangular table including a plurality of graphical classification elements, each graphical classification element comprising a column of the rectangular table, each column representing a corresponding multimedia program and wherein each global classification element includes a plurality of blocks, each block within a graphical classification element corresponding to a different genre, wherein a first dimension of each block conveys a rating of the corresponding multimedia program and a second dimension of each block conveys a degree to which the corresponding multimedia program belongs to the corresponding genre.

22. The data processing system of claim 21, wherein the set of metadata nodes includes an actor metadata node, a writer metadata node, a director metadata node, and an air date metadata node.

23. The data processing system of claim 21, wherein the subordinate interface includes a recommendation node configured to display recommendations for the user based, at least in part, on the selected multimedia program.

24. The data processing system of claim 21, wherein the subordinate interface includes a friend node identifying a friend of the user and a rating node indicating an evaluation of the selected multimedia program.

25. The data processing system of claim 21, wherein the subordinate interface includes a mosaic including a plurality of graphical classification elements, each corresponding to a content category, wherein a size of a first dimension of each of the plurality of graphical classification elements indicates a degree of the corresponding category present in the selected multimedia program.

26. The data processing system of claim 25, wherein a size of a second dimension of the mosaic indicates a rating of the selected multimedia program.

27. A non-transitory computer readable storage medium including stored, processor executable instructions that, when executed by a processor, cause the processor to perform operations comprising:
responding to a first input from a user by displaying a first electronic programming guide interface, the first electronic programming guide interface including:
a first primary node representing multimedia content available to the user; and
a first set of secondary nodes positioned along a first axis extending radially from the first primary node, wherein each of the first set of secondary nodes identifies a corresponding multimedia program available for selection by the user;
a second set of secondary nodes positioned along a second axis extending radially from the first primary node, wherein each of the second set of secondary nodes identifies a time slot; and
a third set of secondary nodes positioned along a third axis extending radially from the first primary node, wherein the third set of secondary nodes identifies friends of the user; and
responding to a second input from a user indicating a selected secondary node from the second set of secondary nodes by displaying a second electronic programming guide interface indicating a plurality of multimedia programs available during the time slot identified by the selected secondary node; and
responding to a second input from a user indicating a selected secondary node from the second set of secondary nodes by displaying a third electronic programming guide interface identifying multimedia programs belonging to the category corresponding to the selected secondary node; and wherein at least one of the first set of secondary nodes and the second set of secondary nodes is displayed as a compact mosaic and further wherein the compact mosaic comprises a rectangular table including a plurality of graphical classification elements, each graphical classification element comprising a column of the rectangular table, each column representing a corresponding multimedia program and wherein each global classification element includes a plurality of blocks, each block within a graphical classification element corresponding to a different genre, wherein a first dimension of each block conveys a rating of the corresponding multimedia program and a second dimension of each block conveys a degree to which the corresponding multimedia program belongs to the corresponding genre.

* * * * *